(12) United States Patent  
Ivarsson et al.

(10) Patent No.: US 11,089,254 B2  
(45) Date of Patent: Aug. 10, 2021

(54) IMAGE SENSOR FOR VISION BASED ON HUMAN COMPUTER INTERACTION

(71) Applicant: Tobii AB, Danderyd (SE)

(72) Inventors: Magnus Ivarsson, Danderyd (SE); Per-Edvin Stoltz, Danderyd (SE); David Masko, Danderyd (SE); Niklas Ollesson, Danderyd (SE); Mårten Skogö, Danderyd (SE); Peter Blixt, Danderyd (SE); Henrik Jönsson, Danderyd (SE)

(73) Assignee: Tobii AB, Danderyd (SE)

( * ) Notice: Subject to any disclaimer, the term of this patent is extended or adjusted under 35 U.S.C. 154(b) by 0 days.

(21) Appl. No.: 16/796,501

(22) Filed: Feb. 20, 2020

(65) Prior Publication Data

US 2021/0014442 A1 Jan. 14, 2021

Related U.S. Application Data

(63) Continuation of application No. 15/976,640, filed on May 10, 2018, now Pat. No. 10,594,974, which is a continuation-in-part of application No. 15/482,421, filed on Apr. 7, 2017, now abandoned.

(60) Provisional application No. 62/319,666, filed on Apr. 7, 2016.

(51) Int. Cl.
```
H04N 5/378     (2011.01)
G06K 9/00      (2006.01)
G06T 7/70      (2017.01)
G06K 9/32      (2006.01)
H04N 5/225     (2006.01)
G06F 3/01      (2006.01)
H04N 5/345     (2011.01)
H04N 5/33      (2006.01)
H04N 9/04      (2006.01)
```

(52) U.S. Cl.  
CPC ............. *H04N 5/378* (2013.01); *G06F 3/012* (2013.01); *G06F 3/013* (2013.01); *G06K 9/00604* (2013.01); *G06K 9/3208* (2013.01); *G06K 9/3233* (2013.01); *G06T 7/70* (2017.01); *H04N 5/2256* (2013.01); *H04N 5/332* (2013.01); *H04N 5/345* (2013.01); *H04N 9/04553* (2018.08); *G06T 2207/10152* (2013.01)

(58) Field of Classification Search  
None  
See application file for complete search history.

(56) References Cited

U.S. PATENT DOCUMENTS

| 2003/0081817 A1* | 5/2003 | Nakaigawa | G06K 9/00604 382/118 |
| 2013/0202159 A1* | 8/2013 | Jeon | G06K 9/00268 382/116 |
| 2015/0220768 A1* | 8/2015 | Ronnecke | G06K 9/0061 348/78 |

(Continued)

*Primary Examiner* — Frederick D Bailey  
(74) *Attorney, Agent, or Firm* — Samuel I. Yamron

(57) ABSTRACT

Techniques for reducing a read out time and power consumption of an image sensor used for eye tracking are described. In an example, a position of an eye element in an active area of a sensor is determined. The eye element can be any of an eye, a pupil of the eye, an iris of the eye, or a glint at the eye. A region of interest (ROI) around the position of the eye is defined. The image sensor reads out pixels confined to the ROI, thereby generating an ROI image that shows the eye element.

7 Claims, 22 Drawing Sheets

(56) References Cited

U.S. PATENT DOCUMENTS

| | | | |
|---|---|---|---|
| 2016/0063347 A1* | 3/2016 | Kim | G06K 9/0061 |
| | | | 348/78 |
| 2016/0125241 A1* | 5/2016 | Ebisawa | H04N 5/23219 |
| | | | 348/78 |
| 2016/0179336 A1* | 6/2016 | Ambrus | G02B 27/017 |
| | | | 715/768 |
| 2016/0198091 A1* | 7/2016 | Edwards | G06F 3/013 |
| | | | 348/78 |

* cited by examiner

= NIR ILLUMINATION

= NIR ILLUMINATION

= NIR ILLUMINATION

NO USER PRESENT

USER SITTING FAR BACK

USER SITTING CLOSE UP

CAMERA COVERED

IMAGE SENSOR FOR VISION BASED ON HUMAN COMPUTER INTERACTION

CROSS-REFERENCE TO RELATED APPLICATIONS

This application is a continuation of U.S. patent application Ser. No. 15/976,640, filed May 10, 2018, which is a Continuation-In-Part of Non-Provisional U.S. patent application Ser. No. 15/482,421 filed Apr. 7, 2017, which claims priority to Provisional U.S. Patent Application No. 62/319,666 filed Apr. 7, 2016, the entire disclosures of which are hereby incorporated by reference, for all purposes, as if fully set forth herein.

BACKGROUND

Interaction with computing devices is a fundamental action in today's world. Computing devices, such as personal computers, tablets, smartphones, are found throughout daily life. In addition, computing devices that are wearable, such as wearable headset devices (e.g., virtual reality headsets and augmented reality headsets), are becoming more popular. The systems and methods for interacting with such devices define how they are used and what they are used for.

Advances in eye tracking technology have made it possible to interact with a computing device using a person's gaze information, such as the position on a display the user is gazing at. This information can be used for interaction solely, or in combination with a contact-based interaction technique (e.g., using a user input device, such as a keyboard, a mouse, a touch screen, or another input/output interface).

Previously proposed interaction techniques using gaze information can be found in U.S. Pat. No. 6,204,828, U.S. Patent Application Publication 20130169560, U.S. Pat. No. 7,113,170, U.S. Patent Application Publication 20140247232, and U.S. Pat. No. 9,619,020. The full specification of these patents and applications are herein incorporated by reference.

Generally, an eye tracking system is used to detect the person's gaze. The eye tracking system includes a set of cameras capturing images of eyes. The gaze information is derived from the images. The processing of the images levies a computational burden and consumes power. It is desirable to reduce the computational burden and power consumption.

SUMMARY

Systems, methods, and computer-readable storage media storing computer-readable instructions for reducing image sensor readout time and power consumption are described. In an example, an eye element is detected from an image generated based on an image sensor. The eye element comprises at least one of: an eye, a pupil of the eye, an iris of the eye, or a glint at the eye. A position corresponding to the eye element in an active area of the image sensor is determined. The active area corresponds to pixels of the image sensor. A region of interest (ROI) is positioned within the active area. For example, the ROI is positioned around the position corresponding to the eye element and is smaller than the active area. Only a subset of the pixels of the image sensor are read out. The subset corresponds to the ROI.

These illustrative features are mentioned not to limit or define the disclosure, but to provide examples to aid understanding thereof. These and additional features may be implemented independently in various embodiments or may be combined in yet other embodiments, further details of which can be seen with reference to the following description and illustrations. Advantages offered by one or more of the various embodiments may be further understood by examining the specification or by practicing one or more of the various embodiments

BRIEF DESCRIPTION OF THE DRAWINGS

The present disclosure is described in conjunction with the appended figures.

Figure 1:
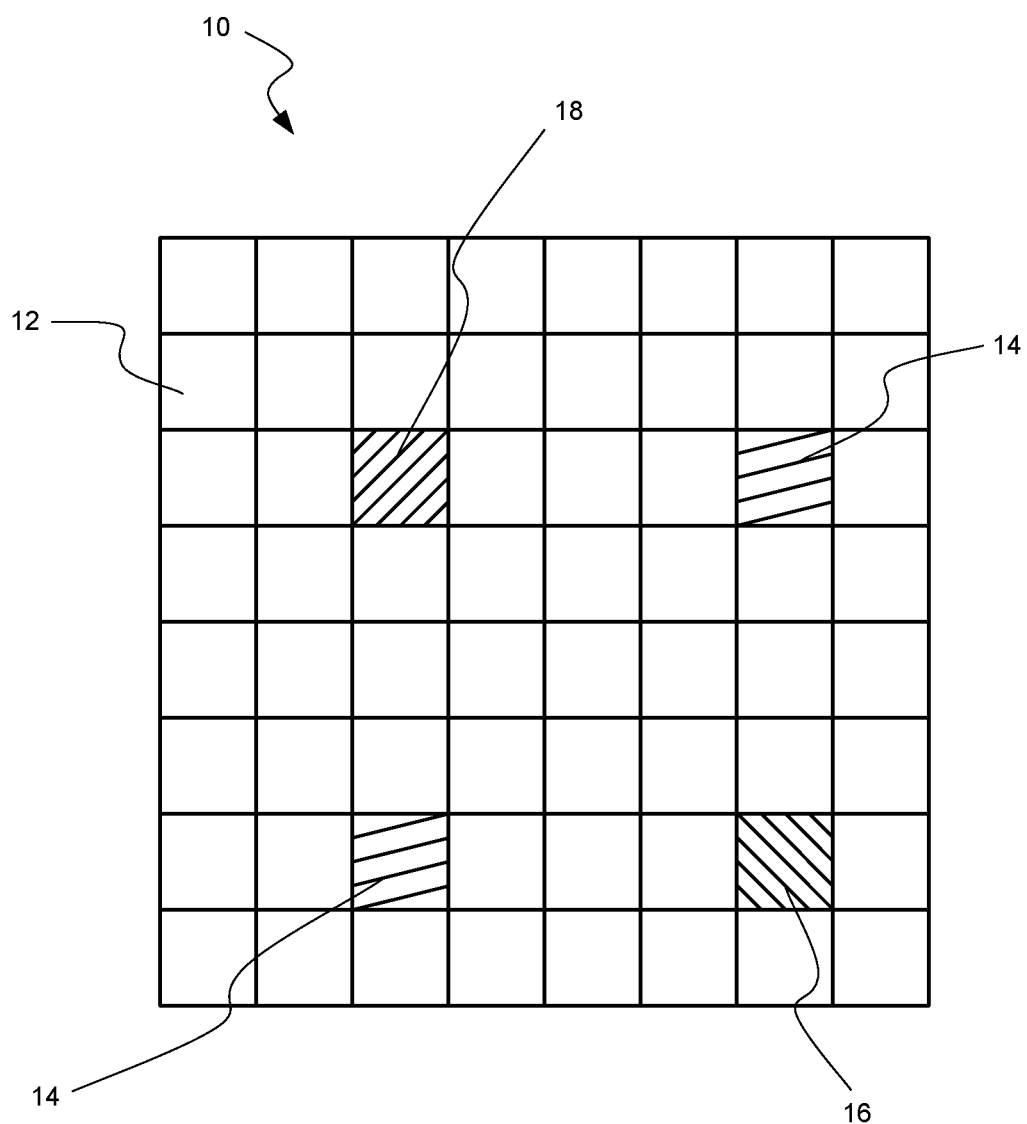
FIG. 1 is a diagram view of one image sensor of the disclosure.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

The present disclosure generally relates to an image sensor particularly suited for vision based human computer interaction, and methods for using said image sensor.

Image sensors of different types, functions, and designs are well known. Typically an image sensor is adapted to function in a wide variety of fields.

Fundamentally an image sensor is comprised of a photosensitive substrate containing multiple photosites, when light photons are collected in a photosite—an electrical charge is produced. Typically one photosite is associated with one pixel of an image sensor. The size of the electrical charge is dependent on the amount of light collected, such that a brighter light will result in a higher charge. Once an exposure is complete, each photosites electrical charge is measured and turned into a digital value by an analogue-to-digital converter.

Two forms of image sensor technology comprise the majority of today's image sensors—CCD and CMOS image sensors. A Charge-Coupled Device (CCD) image sensor comprises multiple pixels represented by p-doped MOS capacitors. These capacitors allow for conversion of incoming photons into electron charges at the semiconductor-oxide interface, the CCD then reads out these charges via a gate structure that requires a separate power source.

The most common form of image sensor today is a CMOS image sensor, where the image sensor is an active pixel sensor made using Complementary Metal-Oxide-Semiconductor (CMOS) technology. Fundamentally the CMOS image sensor operates in the same way as a CCD image sensor, however it is manufactured using a much higher yield process. A CMOS image sensor contains a large array of transistors comprising a photodiode and amplifier. The photodiodes accumulate electrical charge when exposed to light, and those charges are then converted to voltage, amplified and transmitted as electrical signals.

CMOS image sensors typically consume less power than a CCD image sensor and can read out electrical charges much more rapidly.

As an image sensor fundamentally only records the level of light, in order to record color information a Bayer filter is typically used. A Bayer filter is a color filter bonded to the sensor substrate which allows only photons of a certain color to enter each pixel. By alternating the filter across the pixels between red, green and blue, light of different colors can be recorded by different adjacent pixels.

Although previous image sensors have been proposed for functioning with vision based human computer interaction, an image sensor using the techniques herein described has not been previously described, particularly for use in eye tracking technology.

It is an object of the present disclosure to propose an image sensor adapted to function with eye tracking, and other vision based human computer interaction technology.

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the disclosure as set forth herein.

For example, any detail discussed with regard to one embodiment may or may not be present in all contemplated versions of that embodiment. Likewise, any detail discussed with regard to one embodiment may or may not be present in all contemplated versions of other embodiments discussed herein. Finally, the absence of discussion of any detail with regard to embodiment herein shall be an implicit recognition that such detail may or may not be present in any version of any embodiment discussed herein.

Specific details are given in the following description to provide a thorough understanding of the embodiments. However, it will be understood by one of ordinary skill in the art that the embodiments may be practiced without these specific details. For example, circuits, systems, networks, processes, and other elements in the disclosure may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

The term "machine-readable medium" includes, but is not limited to transitory and non-transitory, portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments of the disclosure may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

To begin then, an object of the present disclosure is to provide an image sensor suitable for use with vision based human computer interaction. According to a first aspect of the present disclosure, there is provided an image sensor containing an integrated Bayer filter and near-infrared light (NIR) filter.

As would be readily understood by a person of skill in the art, a Bayer filter filters visible light apart from Red, Green or Blue (RGB) light from entering a pixel, or pixels, of an image sensor. An NIR filter typically prevents light below approximately 650 nanometers (nm) from entering a pixel, or pixels, of an image sensor. NIR light may be light at 850 nm, 905 nm, 940 nm, 1100 nm, and/or some other NIR wavelength.

As many vision based human computer interaction technologies, such as eye tracking, require infrared light to function, it is advantageous that an image sensor be adapted to incorporate both forms of filter.

Eye tracking is one example of a vision based human computer interaction technology. In eye tracking, at least one image sensor and at least one illuminator combine to determine the direction of a user's gaze. There are generally two types of eye tracking techniques: "Bright Pupil" (BP) and "Dark Pupil" (DP). BP eye tracking comprises an illumination source coaxial with the optical path of an image sensor, a user's eye then acts as a retroreflector as the light from the illumination source reflects off the retina, creating a bright pupil effect similar to red eye. If the illumination source is non-coaxial, as in DP eye tracking, then the pupil appears dark because the retroreflection from the retina is directed away from the camera.

Both eye tracking techniques function adequately, most often using Near Infrared Illumination. BP eye tracking creates greater iris/pupil contrast, but is more sensitive to ambient light such as is present outdoors. While DP eye tracking generally functions with more ethnicities than BP eye tracking. The present disclosure can function with either form of eye tracking.

In order to achieve an image sensor that filters both RGB and NIR light, several alternatives exist. Each will be described here in the context of the present disclosure.

In the first alternative, a sensor is provided with dimensions for example of 2,048 pixels×2,048 pixels. 15 out of 16 pixels have a filter associated therewith which allows only NIR light to enter, while 1 pixel out of 16 allows only Red, Green or Blue light as well as NIR light to enter. In some embodiments, the red, green, and blue pixels may include an NIR filter, and not allow NIR light to pass. In yet other embodiments, red, green, and blue pixels will not be present, possibly especially in embodiments where only eye tracking and not facial feature detection is necessary. In any embodiment discussed herein, different pixel layouts and resolutions may be employed than what is discussed or shown, as the specific embodiments disclosed are merely example configurations of the constructs disclosed.

This allows the image sensor to function as both a traditional RGB image sensor, as well as a NIR sensitive image sensor.

With reference to FIG. 1, a portion of an image sensor 10 is shown in simplified form for illustrative purposes. The image sensor 10 contains pixels 12, with filters responsive to NIR light only and pixels 14, 16 and 18 responsive to Red, Green and Blue light respectively.

In use, the image sensor may operate in multiple modes, as follows:

Mode 1—RGB

Figure 2:
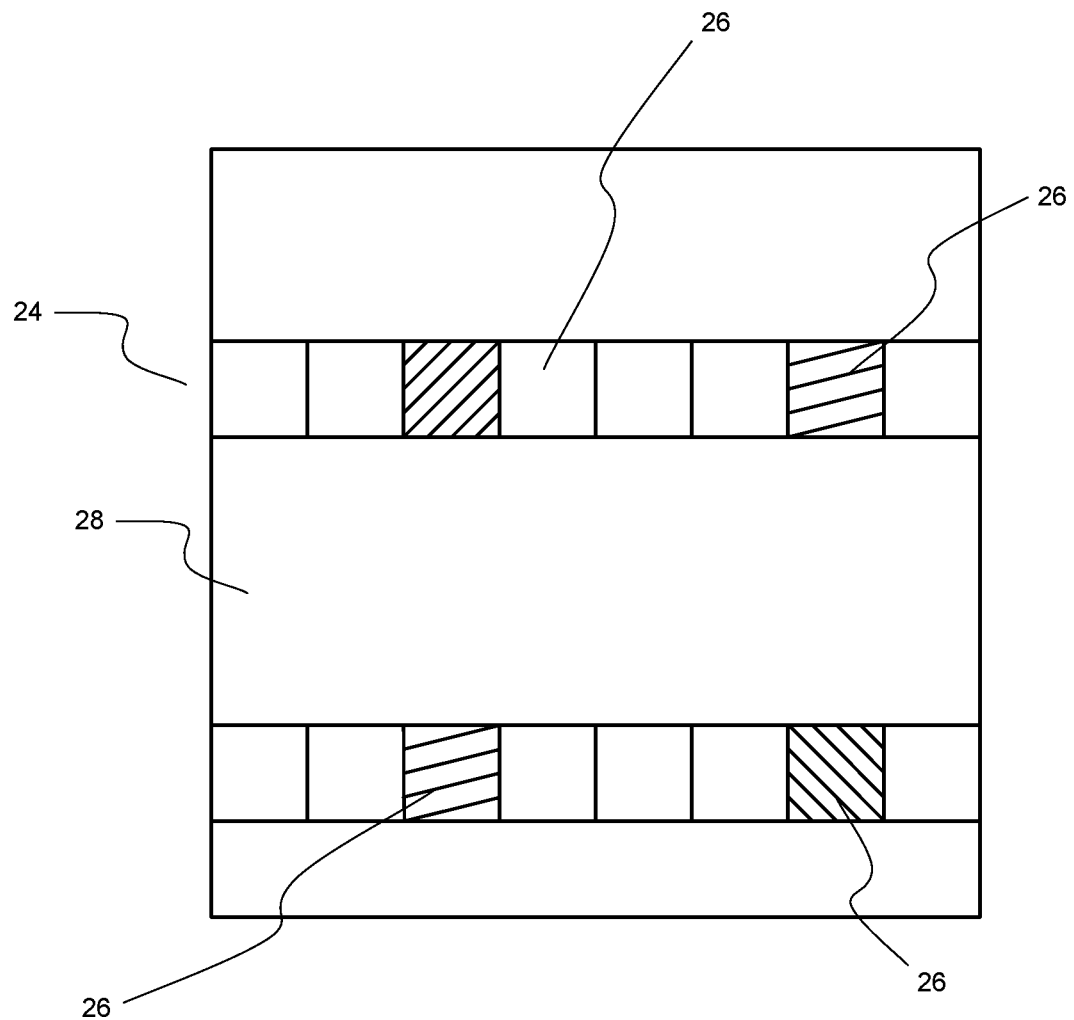
FIG. 2 is a diagram view of the image sensor of FIG. 1 where only two rows are being activated.

In RGB mode the image sensor may read out an image comprised of only pixels with associated RGB images. Typically this will be a subset of the total active image sensor area, for example if the image sensor comprises a matrix of 2,048×2,048 pixels, a 512×512 subset of the pixels may be read out from the image sensor where 3 out of 4 pixels on each row are skipped and 3 out of 4 rows are skipped such that only those pixels with an associated R, G or B filter are read out. FIG. 2 demonstrates how such images may be read out, where pixels that are read out are denoted by numerals 24, RGB pixels by numeral 26 and non-read out areas of the image sensor by numeral 28.

When reading out the image, only sensor lines having Red, Green, or Blue pixels are read out. The read-out data is run through a 1×3 kernel to subtract the average values of the adjacent NIR pixels from the Red, Green and Blue pixels respectively such that their values represent only the signal from the intended color. Subsequent to this only data from the quarter of the remaining pixels that represent the Red, Green, and Blue pixels that have been NIR compensated are kept. Data from the remaining three quarters of pixels are discarded.

Mode 2—Clean IR

A subset of the total image area, such as a 512×512 image may be read out from the image sensor in binning and/or skipping mode, all Red, Green, and Blue sensitive pixels are skipped so that only NIR sensitive pixels are read out. A first image is read out from the image sensor while the infrared light is activated, and then an identical second image is read out where the infrared light is not active. The second image is subtracted from the first image, resulting in a third image that comprises only infrared light—the so-called "Clean IR" image.

Ideally the two images should be captured very close in time to ensure minimal defects caused by objects having moved between the two images. The actively illuminated image may be captured before or after the non-lit image.

Mode 3—Region of Interest

In a Region of Interest mode (ROI), a subset of the active area of an image sensor is read out so as to contain within the image certain features. For example, in eye tracking it is known to read out only a portion of a total image area containing an eye, or eyes, of a user. See for example, U.S. Pat. No. 7,572,008 for more information. The entire disclosure of the aforementioned patent is hereby incorporated by reference, for all purposes, as if fully set forth herein.

In the present disclosure, a region of interest may be read out using just NIR sensitive pixels or including all pixels (also Red, Green and Blue) within an area. The concept of a Clean IR image can be used also when capturing region of interest images. Even if some of the pixels are sensitive also to visible light, the image remaining after subtraction of an ambient light image will only be the image caused by the active illumination, which in case of a NIR illuminator will be a NIR image.

A portion of the active area of an image sensor is read out while strobing NIR illumination from an illumination source. All pixels collect at least a portion of this strobed illumination, as well as ambient NIR illumination. The Red, Green and Blue pixels will also collect a portion of ambient visible light. These Red, Green and Blue pixels will thus have higher values than if they were pure NIR pixels. In an eye tracking device, in the case of a short exposure time, these images may still be used to determine a glint from the pupil of a user.

In this mode, the Red, Green and Blue pixels may register high values while the NIR pixels register relatively low values. This is due to the sensor having lower quantum efficiency at the wavelength of the NIR illumination than at the wavelengths of visible light. To minimize the impact of this issue and to better utilize the pixel dynamics, pixel gain and pixel offset can be set differently for NIR and Red, Green, and Blue pixels. For instance the gain of Red, Green and Blue pixels may be set lower than that of the NIR pixels. If this is the case it must later on be compensated for in the algorithms.

Alternatively, or additionally, the images may be captured as 10 or 12 bits of data per pixel, but then, especially in the mode of clean IR after having subtracted an ambient light image, the image may be transferred into 10, 8 or even fewer bits per pixel.

As an optional improvement, a processing device connected to the image sensor may interpolate data read out from the sensor to replace the Red, Green and Blue pixel values with average NIR values from adjacent pixels.

Further, in another aspect of the present disclosure, regions of interest read out of the image sensor may have varying characteristics. For example, the region of interest may be oriented horizontally or vertically. Further, more than one region of interest may be read out of the image sensor simultaneously.

Consider the example use case of eye tracking, in traditional imaging technology, one region of interest may be read out comprising both eyes of a user. This region of interest also comprises extra information, such as the area of the persons face between the two eyes. This extra information is not needed for eye tracking, and thus the power and data use in capturing this extra information is wasted. By reading out two regions of interest comprising substantially a single eye or pupil each, excess data and power is not consumed, and at the same time the read out time is minimized. If the sensor is of a rolling shutter type, this also means that the amount of ambient light being collected by the sensor is minimized.

By reading out regions of interest with varying orientations, the image sensor may function in multiple orientations. For example, it is advantageous, due to the natural shape of an eye, to read out a substantially landscape view of a user's eye. In a normally oriented image sensor, this is possible due to the image sensor having typically a landscape layout of pixels (a larger size in the x-dimension than in the y-dimension), but if the image sensor is rotated (such as may be the case in portable device such as a phone or tablet), the image sensor cannot read out a landscape region of interest comprising only an eye. In order to capture the entire eye or pupil, the image sensor would have to read out a large portrait image.

In order to affect a rectangular or square image readout, multiple regions, such as four, may be read out forming a rectangle or square. These may be read out using a standard image transfer format such as the MIPI standard published by The MIPI Alliance (www.mipi.org). Alternatively the read out interface may be a sensor internal interface that transfers image data to a second layer of the sensor containing processing capabilities. This kind of 3D stacked sensors containing an active photosensing layer stacked with a processing layer and often also a third memory/RAM layer have become more and more common in the last year, specifically in smart phones. These four regions of interest may be used to form any orientation of shape, for example they may be used to form a diagonally oriented shape.

Further, it is known that power consumption scales at an approximate rate to the increase in read out area. By not reading out the area between the eyes, pixels and analog-to-digital converters (ADCs) can be powered down for those areas. An image sensor according to the current state of the art reads out complete rows, which provides unnecessary power for pixels not of interest.

One specific implementation for multiple region of interests that is optimized for eye tracking purposes is to always have four non-overlapping equally sized regions of interest read out, for example each region may be 120×120 pixels in size. The sum of these regions of interests are placed to include the expected positions of the two eyes of a person located in front of an eye tracker comprising an image sensor according to the present disclosure.

Further, there is also an additional restriction that the two top most regions of interest are always located on the same rows, the two bottom most are also located on the same rows, the two left most are located on the same columns and the two right most are located on the same columns. Thus, for a given size of the regions of interest only two 'x' coordinates and two 'y' coordinates are needed to fully define the regions to read out.

The four regions of interest, each being 120×120 pixels, are then read out and combined into a single 240×240 image. Alternatively an image of 240×241 pixels may be sent out from the sensor where the first or last line may include meta data describing the coordinates of the regions of interests on the sensor and other data of relevance for the algorithms to be able to use the image.

The benefit of this approach is that the read out time for a multiple regions of interest image will be the same independent of the head orientation of a user and read out area is minimized to lower the negative impact of ambient light on the performance of the eye tracker.

Additionally, if a user is leaning forward towards an eye tracker and due to their proximity to the eye tracker, the eyes of the person, too large to fit within a 120×120 region of interest, the sensor may enter a mode using 2×2 skipping yet still operating in the previously described mode in order to reduce all objects to half size in image pixels while still keeping the same read out format and approximately the same read out time.

Figure 6:
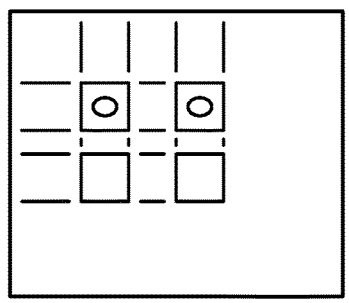
FIG. 6 is a diagram view of various configurations of multiple areas of interest imaged by image sensors of the disclosure.
Figure 6:
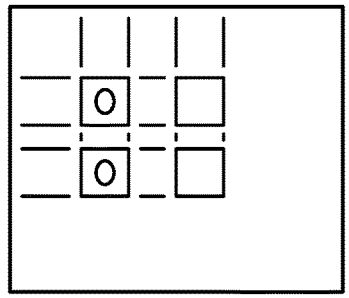
Figure 6:
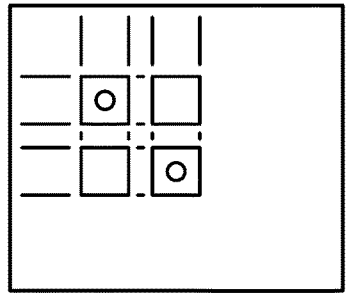
Figure 6:
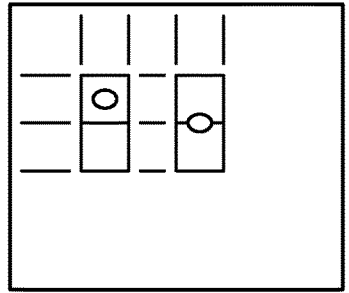
Figure 6:
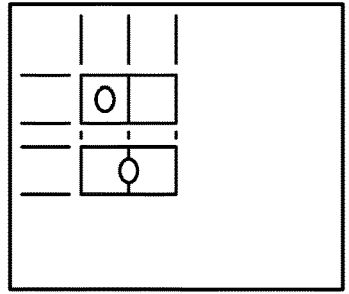

In order to illustrate this aspect of the present disclosure, FIG. 6 shows various possible orientations for multiple regions of interest. In FIG. 6, a user's eyes are displayed as circles, and regions of interest are shown as squares.

Binning and Skipping

Figure 3:
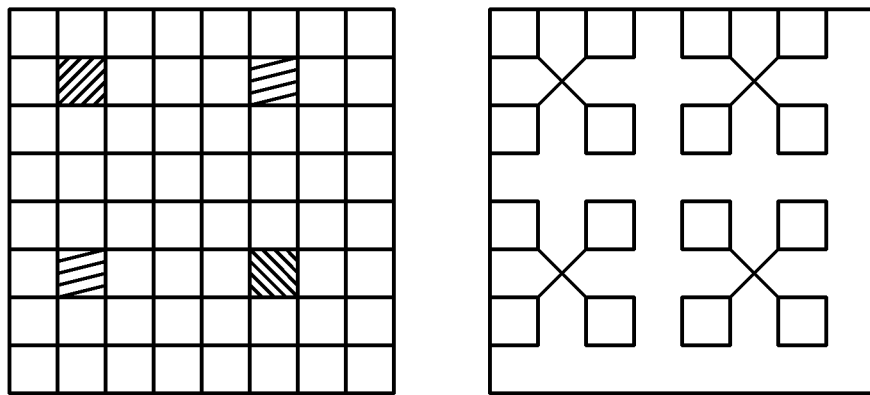
FIG. 3 is a diagram view of another image sensor of the disclosure where binning is employed.
Figure 4:
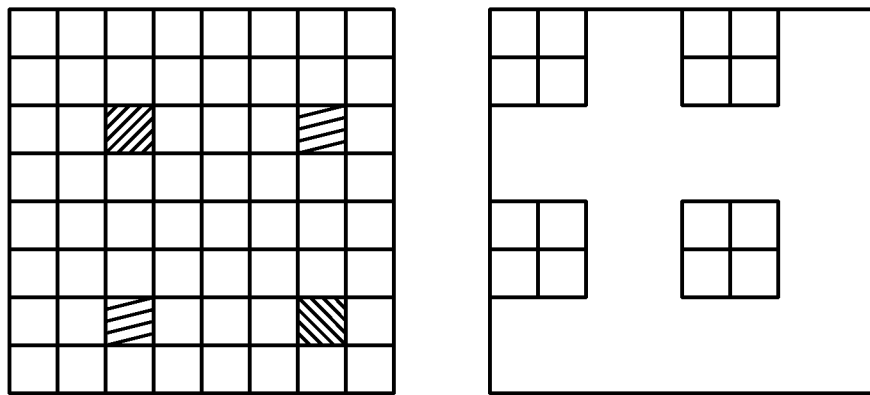
FIG. 4 is a diagram view of the image sensor of FIG. 1 where skipping is employed.

According to the present disclosure, two different forms of binning and/or skipping may be used. These are demonstrated in FIG. 3 and FIG. 4. FIG. 3 allows for a low resolution image where it is often possible to determine a glint in an eye tracking system since the gaps between pixels that are read out are fairly small so no imaged objects can fall between read out pixels.

Burst Sequence

Figure 5:
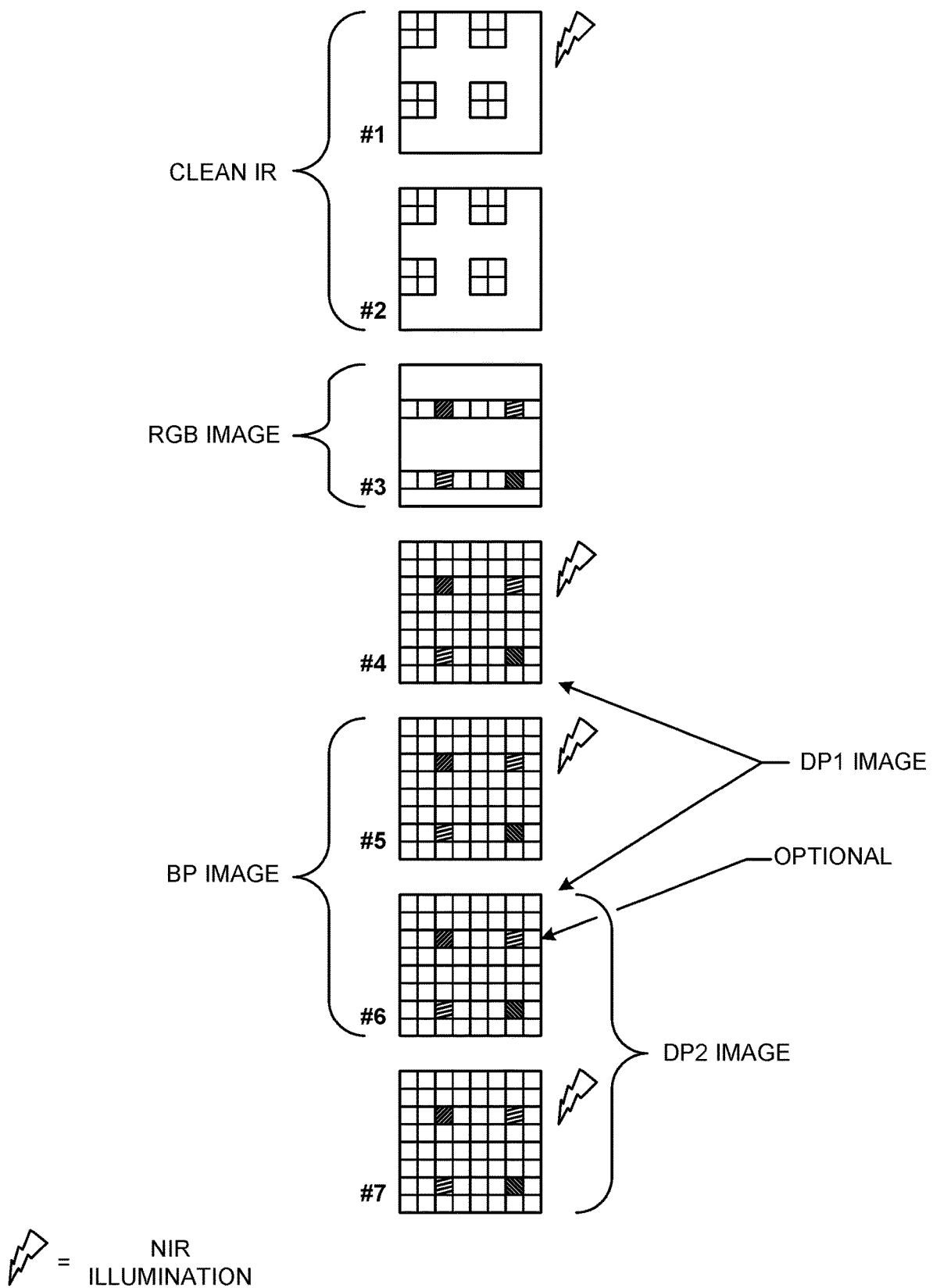
FIG. 5 is a diagram view of a sequence of images obtained in a single cycle of a bust mode imaging process.

According to the present disclosure, it is possible to operate the image sensor in a burst sequence of several modes. FIG. 5 shows an example of such a sequence.

In this example sequence, which may be performed in any order, a first and second image are read out in accordance with the Clean IR aspect of the disclosure previously described. A third image is then read out from the image sensor according to the RGB aspect of the present disclosure previously described. Following this third image are four Region of Interest (ROI) images according to the previously described aspect of the present disclosure.

These four ROI images will now be described in greater detail in the context of their use in an eye tracking system. In an eye tracking system it is desirable to generate images which illustrate a "dark pupil" effect and images which illustrate a "bright pupil" effect. These effects and their use in eye tracking have been previously described in this specification, and would be readily understood by a person of skill in the art.

The fourth image in the sequence is an ROI image having the DP effect, namely an illuminator off-axis from the image sensor has emitted infrared illumination towards the pupil of a user. The fifth and optional sixth images of the sequence are ROI images having the BP effect, namely an illuminator on-axis with the image sensor has emitted infrared illumination towards the pupil of a user. The seventh and final image in the sequence is an ROI image captured with the DP illuminator lit. Optionally, the optional sixth image including only ambient light may be subtracted from the seventh and/or the fourth image in the sequence in order to subtract ambient light and isolate only active illumination in the DP images. The primary trade-off here is that the images have been captured further apart in time and subtraction of one from the other has a higher risk of adding artefacts due to objects having moved between the exposures.

In a further aspect of the present disclosure, it is possible to read out a sequence of images only comprising images suitable for eye tracking. In this aspect of the present disclosure, this sequence of images is approximate to the fourth, fifth, sixth and seventh images in the previously described sequence of images.

It is preferable to have a sensor where a full image sequence (i.e., a burst mode) can be programmed at once, including illumination type and timing, exposure times, gain, binning/skipping, ROI size and position, etc. for each image. In some embodiments, only the ROI size/position of the overall available image may be updated for subsequent images while in burst mode.

It is also preferable to have the sensor go into a low power mode directly after the image sequence has been captured. In this low power mode the sensor should preferably still be responsive to reprogramming of the next image sequence while most of the other parts of the sensor are asleep.

As described herein, an image sensor is therefore adapted to allow for three forms of images: RGB, subsampled images through binning or skipping, and ROI or cropped images. For the latter two types of images, two subsequent image captures, one with active illumination and one without, may be used to create a Clean IR version of the image. This image sensor therefore may function in a variety of modes suitable for use in vision based human computer interaction. For example, an RGB image may be used for facial identification, imaging such as Skype, regular image capture and the like, anti-spoofing when combined with NIR image based biometrics such as face or iris, or for determining eye position to guide Region of Interest readout, a subsampled image (Clean IR image or just a single illuminated image) may be used for facial recognition, facial feature tracking, or for determining eye position to guide Region of Interest readout, and Region of Interest images may be used for eye tracking.

Figure 8:
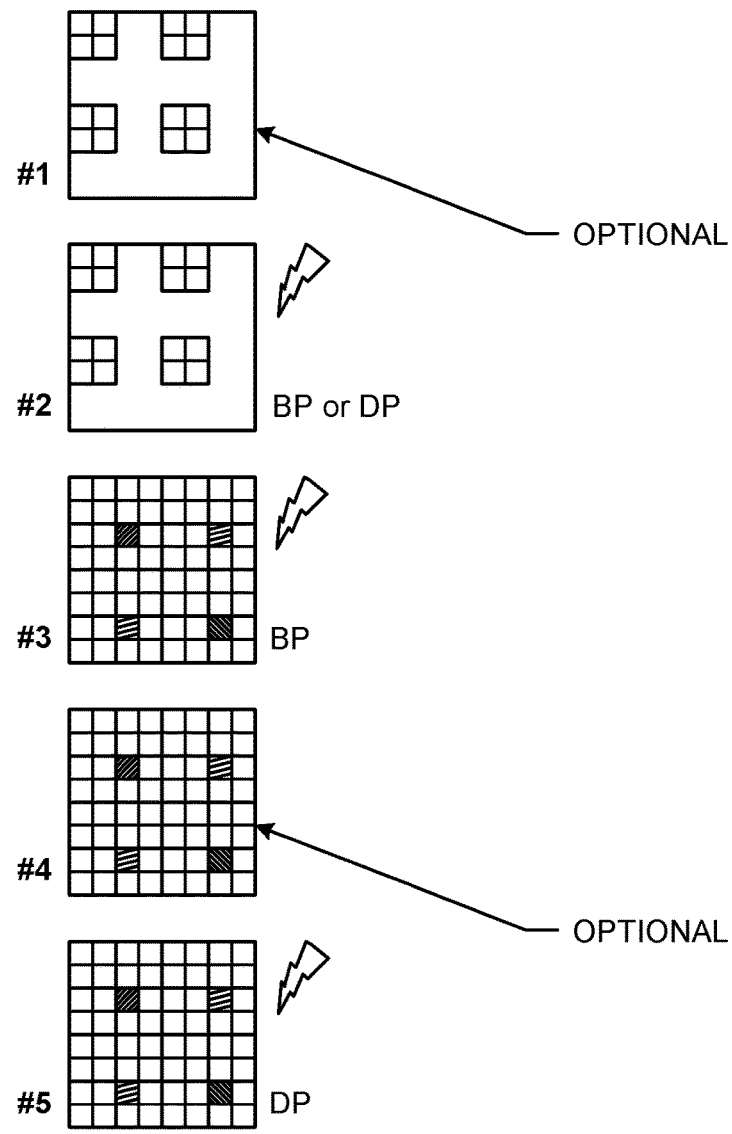
FIG. 8 is a diagram view of a sequence of images obtained in a single cycle of another bust mode imaging process.
Figure 8:

Another possible burst sequence which may be employed by image sensors described herein may include a sequence useful for low-power draw eye tracking and recognition of facial features, and is discussed with reference to FIG. 8. In this burst sequence, three to five frames may include data received for one imaging cycle. An optional first frame may include a binned or skipped NIR image (2×2 skipped and 2×2 binned shown). A second frame may also include a binned or skipped NIR image during a period of illumination by a NIR illuminator (2×2 skipped and 2×2 binned shown). A third frame in a region of interest may include a combined NIR and RGB image during a period of illumination by a NIR illuminator. An optional fourth frame in a region of interest may include a combined NIR and RGB image. A fifth frame in a region of interest may include a combined NIR and RGB image during a period of illumination by a NIR illuminator. The second and third frames described may be employed in BP eye tracking, while the second and fifth frames may be employed for DP eye tracking. In some embodiments, the image sensor employed in this or other sequences may be a NIR-only sensor, without visible light or RGB pixels. This may be a useful solution for eye tracking, facial feature tracking, and/or machine vision with active NIR illumination. While such a sensor cannot output RGB images, it can perform the NIR functions detailed herein.

Figure 9:
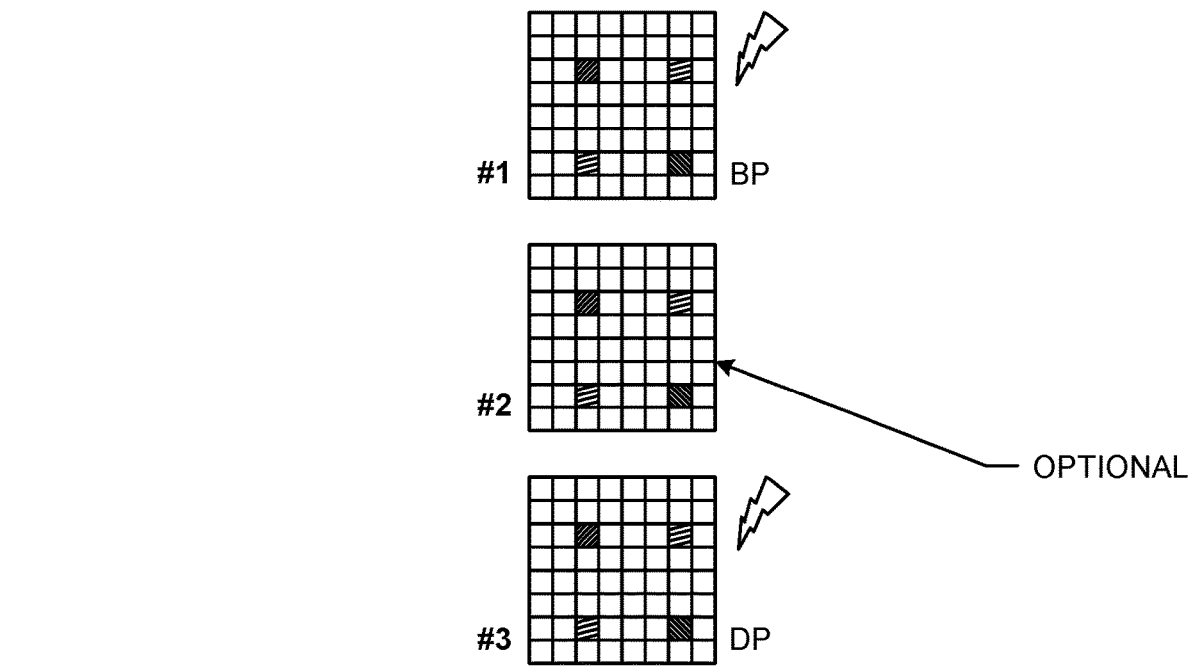
FIG. 9 is a diagram view of a sequence of images obtained in a single cycle of another bust mode imaging process.
Figure 9:

Another possible burst sequence which may be employed by image sensors described herein may include a sequence useful for low-power draw eye tracking, and is discussed with reference to FIG. 9. In this burst sequence, two to three frames may include data received for one imaging cycle. A first frame in a region of interest may include a combined NIR and RGB image during a period of illumination by a NIR illuminator. An optional second frame in a region of interest may include a combined NIR and RGB image. A third frame in a region of interest may include a combined NIR and RGB image during a period of illumination by a NIR illuminator. The first frame described may be employed in BP eye tracking, while the third frame may be employed for DP eye tracking. In some embodiments, the image sensor employed in this or other sequences may be a NIR-only sensor, without visible light or RGB pixels. This may be a useful solution for eye tracking, facial feature tracking, and/or machine vision with active NIR illumination. While such a sensor cannot output RGB images, it can perform the NIR functions detailed herein.

Figure 10:
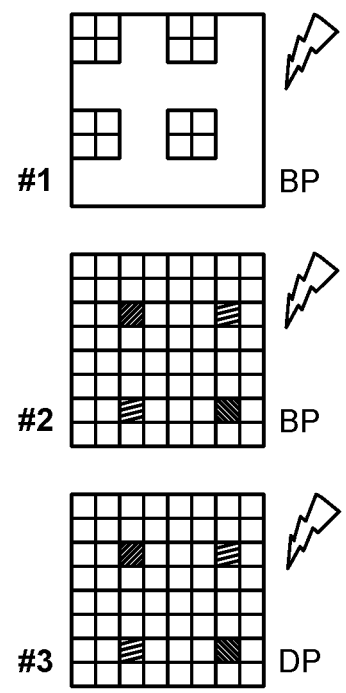
FIG. 10 is a diagram view of a sequence of images obtained in a single cycle of another bust mode imaging process.
Figure 10:

Another possible burst which may be employed by image sensors described herein may include a sequence useful for low-power draw eye tracking and recognition of facial features, and is discussed with reference to FIG. 10. In this burst sequence, three frames may include data received for one imaging cycle. A first frame may include a binned or skipped NIR image during a period of illumination by a NIR illuminator (2×2 skipped and 2×2 binned shown). A second frame in a region of interest may include a combined NIR and RGB image during a period of illumination by a NIR illuminator. A third frame in a region of interest may also include a combined NIR and RGB image during a period of illumination by a NIR illuminator. The first and second frames described may be employed in BP eye tracking, while the third frame may be employed for DP eye tracking. In some embodiments, the image sensor employed in this or other sequences may be a NIR-only sensor, without visible light or RGB pixels. This may be a useful solution for eye tracking, facial feature tracking, and/or machine vision with active NIR illumination. While such a sensor cannot output RGB images, it can perform the NIR functions detailed herein.

Figure 11:
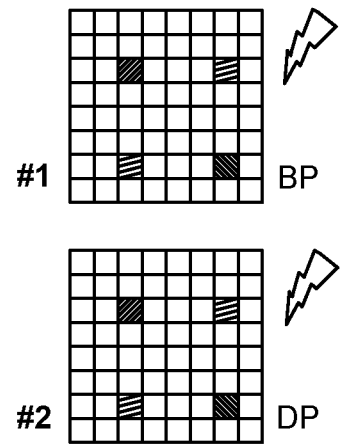
FIG. 11 is a diagram view of a sequence of images obtained in a single cycle of another bust mode imaging process.
Figure 11:

Another possible burst which may be employed by image sensors described herein may include a sequence useful for low-power draw eye tracking, and is discussed with reference to FIG. 11. In this burst sequence, two frames may include data received for one imaging cycle. A first frame may include in a region of interest may include a combined NIR and RGB image during a period of illumination by a NIR illuminator. A second frame in a region of interest may also include a combined NIR and RGB image during a period of illumination by a NIR illuminator. The first frame described may be employed in BP eye tracking, while the second frame may be employed for DP eye tracking. In some embodiments, the image sensor employed in this or other sequences may be a NIR-only sensor, without visible light or RGB pixels. This may be a useful solution for eye tracking, facial feature tracking, and/or machine vision with active NIR illumination. While such a sensor cannot output RGB images, it can perform the NIR functions detailed herein.

Other possible imaging sequences, using either a combined RGB/NIR sensor, as described herein, or a NIR-only sensor as also described herein, may be possible within the scope of the disclosure. Merely by way of example, such imaging sequences may include sequences disclosed in U.S. Patent Publication No. 2015/0262010, the entire disclosure of which is hereby incorporated by reference, for all purposes, as if fully set forth herein.

Figure 12:
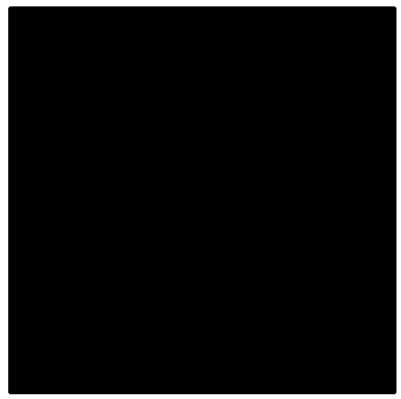
FIG. 12 is a diagram view of different Clean IR images potentially registering the presence or absence of a user in view of image sensors of the disclosure.
Figure 12:
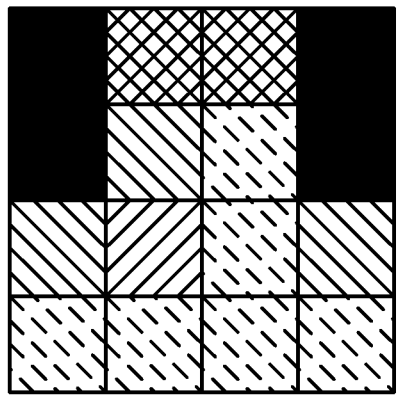
Figure 12:
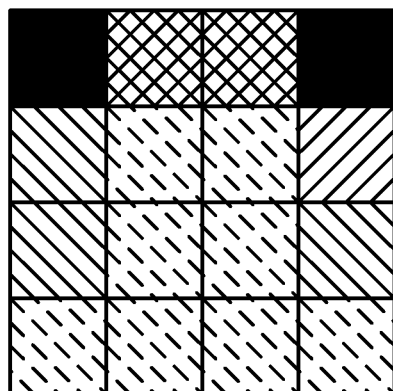
Figure 12:
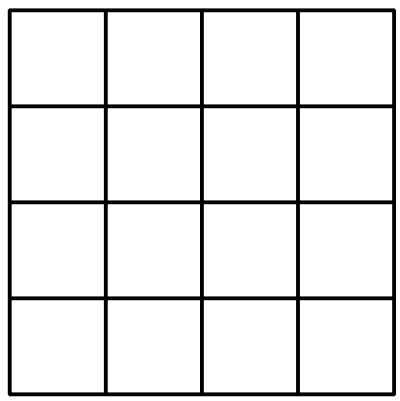

In another embodiment, the image sensors described herein may be useful for determining the presence of a user using low power Clean IR imaging sequences as described herein. A computing device may be in a sleep mode, and only a relevant imaging sensor may be operational to determine when the computing device should be woken. In some of these embodiments, the sensor may be set to operate in an extreme subsampling mode to achieve very low resolution, where preferable a large number of pixels are binned together to increase the sensor's signal to noise. In some cases, some skipping is used to capture a frame during a period of illumination by a NIR illuminator followed closely in time by a frame from the same pixels without the NIR illumination. In this manner a Clean IR image is produced from the image sensor as described herein. As shown in FIG. 12, different Clean IR images of very low resolution may be produced during various states of user presence (or non-presence) in front of the image sensor. By binning a large number of pixels, these images may be achieved with acceptable signal to noise at extremely short exposure times. In addition, these images may be achieved with low power consumption from illumination and also short time between the lit and the unlit image used to create the Clean IR image, thus minimizing motion or other temporal artefacts.

From the Clean IR images receiving in this process, two parameters may be extracted: the maximum pixel value, and the average pixel value. In one embodiment, if (A) the maximum pixel value is less than a first value, (B) the average pixel value is greater than a second value but less than a third value, (C) the quotient of the maximum pixel value divided by the average pixel value is greater than a fourth value but less than a fifth value, and (D) the quotient of the average pixel value divided by the average pixel value of the previous image to the current image is greater than a sixth value but less than a seventh value, then the presence of a user is potentially detected. The first through sixth value are predetermined or dynamic and set to facilitate these variables being useful for detecting user presence. The process is repeated and at a certain threshold total number of potential detections, a user determined to be likely present and the computing device is awoken by a processor so instructed. If any of the above comparisons are false however, the entire process repeats by resetting the number of potential detections to zero and beginning analysis of images per the above anew. In general, any kind of machine vision algorithm can be used to detect presence. In some embodiments using a Clean IR image, only what is illuminated by the active NIR illuminator of the system is detected. A person sitting closer to the illuminator may appear brighter and larger, and a person sitting farther away may appear smaller and less bright. If the person is too close or almost covering the lens in front of the sensor, the illuminator may also be covered and the sensor will capture a pure white image. If a human head and upper body is to be captured within a predefined distance from the sensor (e.g., 20-70 cm from the sensor), it is possible to set one or more thresholds indicating the size and brightness of the object being captured. For example, a threshold indicating a first size or brightness may indicate someone or something closer than 20 cm from the sensor (e.g., the captured object is too large and/or too bright). Similarly, another threshold indicating a second size or brightness may indicate someone or something farther from 70 cm from the sensor (e.g., the object is too small and/or too dark to trigger the system). Although 20 cm and 70 cm are provided as examples, other distances or criteria may be used.

Figure 7:
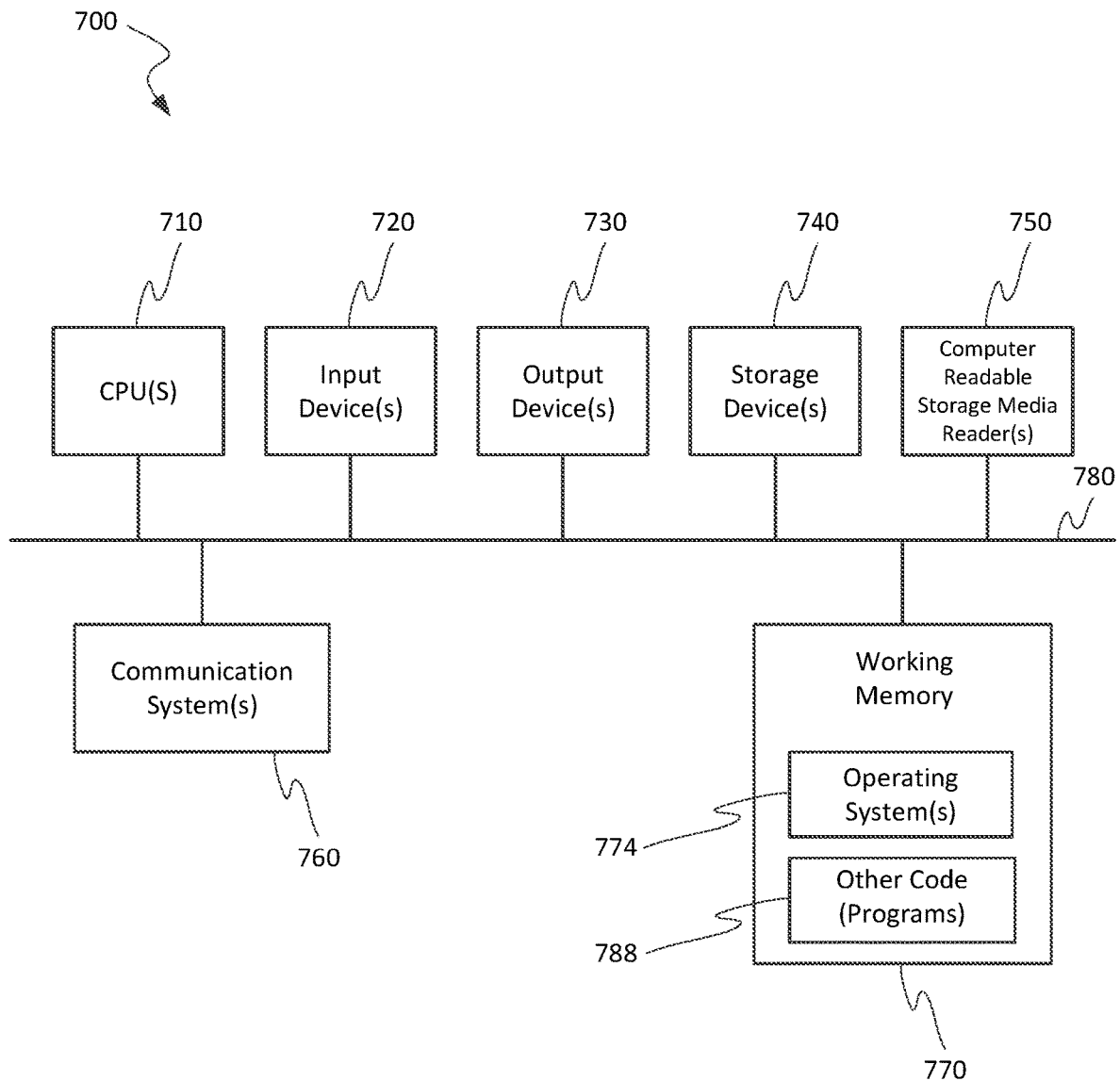
FIG. 7 is a block diagram of an exemplary computer system capable of being used in at least some portion of the apparatuses or systems of the present disclosure, or implementing at least some portion of the methods of the present disclosure.

FIG. 7 is a block diagram illustrating an exemplary computer system 700 in which embodiments of the present disclosure may be implemented. This example illustrates a computer system 700 such as may be used, in whole, in part, or with various modifications, to provide the functions of the components of the disclosure such as those discussed above. For example, any of the functions discussed above of the image sensor may be controlled by the computer system 700.

The computer system 700 is shown comprising hardware elements that may be electrically coupled via a bus 790. The hardware elements may include one or more central processing units 710, one or more input devices 720 (e.g., a mouse, a keyboard, etc.), and one or more output devices 730 (e.g., a display device, a printer, etc.). The computer system 700 may also include one or more storage device 740. By way of example, storage device(s) 740 may be disk drives, optical storage devices, solid-state storage device such as a random access memory ("RAM") and/or a read-only memory ("ROM"), which can be programmable, flash-updateable and/or the like.

The computer system 700 may additionally include a computer-readable storage media reader 750, a communications system 760 (e.g., a modem, a network card (wireless or wired), an infra-red communication device, Bluetooth™ device, cellular communication device, etc.), and working memory 780, which may include RAM and ROM devices as described above. In some embodiments, the computer system 700 may also include a processing acceleration unit 770, which can include a digital signal processor, a special-purpose processor and/or the like.

The computer-readable storage media reader 750 can further be connected to a computer-readable storage medium, together (and, optionally, in combination with storage device(s) 740) comprehensively representing remote, local, fixed, and/or removable storage devices plus storage media for temporarily and/or more permanently containing computer-readable information. The communications system 760 may permit data to be exchanged with a network, system, computer and/or other component described above.

The computer system 700 may also comprise software elements, shown as being currently located within a working memory 780, including an operating system 784 and/or other code 788. It should be appreciated that alternate embodiments of a computer system 700 may have numerous variations from that described above. For example, customized hardware might also be used and/or particular elements might be implemented in hardware, software (including portable software, such as applets), or both. Furthermore, connection to other computing devices such as network input/output and data acquisition devices may also occur.

Software of computer system 700 may include code 788 for implementing any or all of the function of the various elements of the architecture as described herein. For example, software, stored on and/or executed by a computer system such as system 700, can provide the functions of components discussed herein, and/or other components of the disclosure such as those discussed above. Methods implementable by software on some of these components have been discussed above in more detail.

As described herein above and further described in the next paragraphs, an object of the present disclosure is to reduce the read out time and power consumption of an image sensor used, for example, for eye tracking.

In an embodiment, an eye element is detected based on an image. The eye element includes any of an eye of a user, a pupil of the eye, an iris of the pupil eye, or a glint at the eye. The position corresponding to the eye element in an active area of the image sensor is determined. A region of interest (ROI) is defined and positioned based on the position of the eye element. The image sensor reads out only pixels that belong to the ROI, thereby generating an ROI image that shows the user element. In one example, the ROI image is generated based on a full pixel readout of the ROI without downscaling (binning or skipping). In another example, the ROI image is a downscaled image generated from this full pixel read out. The ROI image can in turn be used to determine an updated position, if any, of the eye element and reposition the ROI around the updated position, as needed, to generate a next ROI image. This process of updating the position of the eye element and repositioning the ROI is repeated over time to track movements of and/or changes to the eye element and, accordingly, generate ROI images that follow the movements and/or changes. The ROI images can be used for different eye tracking applications including, for example, gaze detection and foveated rendering.

In an embodiment, an eye tracking system uses information about two eye elements of a user, where each eye element corresponds to one of the user's eyes. An ROI is defined and positioned for each eye element (e.g., an ROI-left corresponding to the left eye, and an ROI-right corresponding to the right eye). Generally, the two ROIs need not overlap. Two ROI images are generated based on the two ROIs, where each of these images shows one of the eye elements.

The ROI can be sized to correspond to only an eye element and to include a certain context around this element (e.g., the ROI contains the pupil and a context around it but not the entire eye, and does not overlap with the ROI of the other eye element). Hence, the ROI image can be a small image that includes the needed information for the eye tracking application (e.g., for gaze detection, the ROI image shows the pupil and/or glint without showing the entire eye). In addition, this small image very likely shows the eye element because the ROI is positioned around the eye element. Hence, the usability of the ROI image for the eye tracking application (e.g., the success rate of deriving the gaze information from the ROI image) is significantly high. Accordingly, the read out time and power consumption of the image sensor are reduced because only the necessary pixels are read out.

Figure 13:
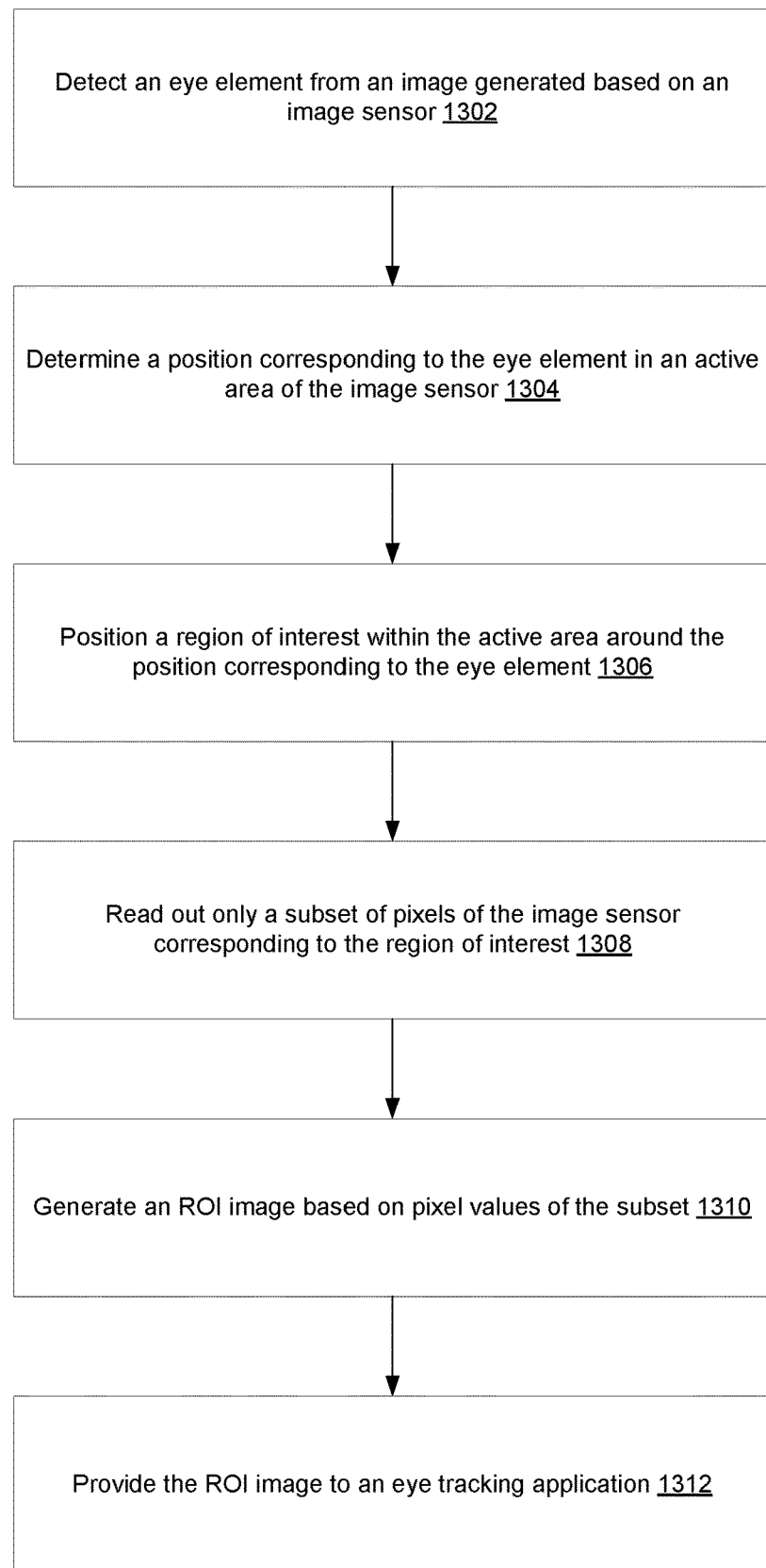
FIG. 13 illustrates an example process for positioning an ROI around a user element.

FIG. 13 illustrates an example process 1300 for positioning an ROI around a user element, according to an embodiment of the present disclosure. An eye tracking system is described as performing blocks of the process 1300. The apparatus can include, for instance, an image sensor, a processor, and a memory (e.g., a non-transitory computer-readable medium). In an example, the apparatus includes some or all of the components illustrated in FIG. 7. The image sensor can be separate from the processor and the memory or can include these two components (e.g., in a processing layer). Instructions for performing the blocks can be stored as computer-readable instructions in the memory. As stored, the instructions represent programmable modules that include code or data executable by a processor(s) of the eye tracking system. The execution of such instructions configures the eye tracking system to perform the specific operations under each block shown in FIG. 13 and described herein. Each programmable module in combination with the processor represents a means for performing a respective operation(s). While the operations are illustrated in a particular order, it should be understood that no particular order is necessary and that one or more operations may be omitted, skipped, and/or reordered.

The flow 1300 starts at block 1302, where the eye tracking system detects, from an image generated based on the image sensor, the eye element. At block 1304, the eye tracking system determines a position corresponding to the eye element in an active area of the image sensor. The active area corresponds to pixels of the image sensor. At block 1306, the eye tracking system positions a region of interest (ROI) within the active area. The ROI is positioned based on the position corresponding to the eye element and is smaller than the active area. At block 1308, the image sensor reads out only a subset of the pixels of the image sensor. The subset corresponds to the ROI. At block 1310, the eye tracking system generates an ROI image based on pixel values of the subset. At block 1310, the eye tracking system provides the ROI image to an eye tracking application hosted, for instance, on the eye tracking system or another system communicatively coupled with the eye tracking system. For instance, the eye tracking application is a gaze-based application. Accordingly, the eye tracking application detects a user gaze based on the ROI image.

In the interest of clarity of explanation, embodiments herein next are described in connection with positioning an ROI around a pupil. In an example, this positioning includes aligning the center of the ROI with the center of the pupil. However, these embodiments similarly apply to positioning ROIs around any of an eye, an iris, or a glint. For instance, an ROI can be aligned with the center of the eye, iris, or glint instead of the pupil's center. In addition, these embodiments similarly apply to positioning multiple ROIs around multiple pupils, where each ROI can be positioned around a corresponding pupil (e.g., an ROI-left for the left pupil and an ROI-right for the right pupil). Generally, the use eye element can detected from an image, its position can be determined from the same or a different image, and the ROI can be positioned given the user eye element's position. Any image used for the detection and/or positioning can be a full sensor image, a DFS image, or an ROI image.

In also the interest of clarity of explanation, embodiments herein next are described in connection with detecting an eye from a DFS image and positioning an ROI around the eye to then detect the pupil. However, the embodiments are not limited as such. Instead, any user eye element, whether the eye, pupil, iris, glint, or a combination thereof can be detected from a DFS image, a full sensor image, or an ROI image and an ROI can be positioned based on the detected user eye element or combination thereof to then detect the same or a different user eye element.

In an example, positioning an ROI includes setting a position and a size of the ROI. The position and/or size can be dynamically changed based on a detection of the pupil in a previous image frame, a detection of the pupil in a previous image burst, or a prediction of the pupil's position based on a history of pupil positions.

Figure 14:
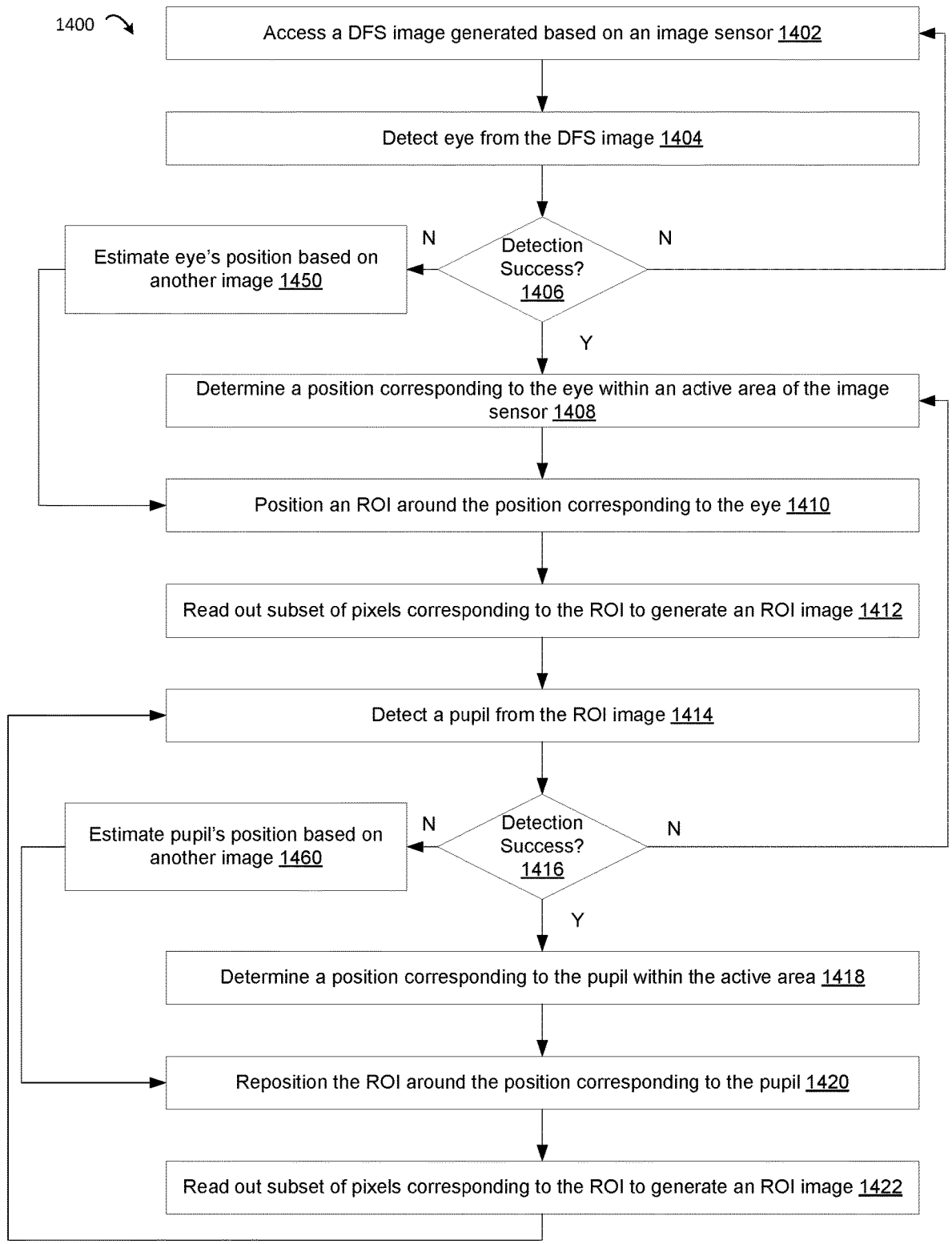
FIG. 14 illustrates an example process for positioning an ROI around a pupil over time based on images available in different image frames.

FIG. 14 illustrates an example process 1400 for positioning an ROI around a pupil over time based on images available in different image frames, according to an embodiment of the present disclosure. The eye tracking system can perform the blocks of the process 1400. Some of the blocks or operations thereof can be implemented as sub-blocks or sub-operations of the process 1300 of FIG. 13.

The flow 1400 starts at block 1402, where the eye tracking system accesses a downscaled full sensor (DFS) image generated in a first image frame based on the image sensor. In an example, the DFS image is accessed from the memory of the eye tracking system. The image sensor of this apparatus includes pixels, as described herein above. The full set of pixels represent an active area of the image sensor and can be arranged or defined according to a grid (e.g., rows and columns). A full image sensor is generated by reading out the pixel values of this full set in the first image frame, during which a set of BP illuminators or DP illuminators is turned on. The DFS image is generated by subsampling the full sensor image and is stored in the memory.

At block 1404, the eye tracking system detects an eye from the DFS image. In an example, the DFS image shows the eye. The detection involves applying an image analysis algorithm, such as an edge detection algorithm, to the DFS image to determine, for instance, a contour and a center of the eye shown in the DFS image.

At block 1406, the eye tracking system determines whether the detection of the eye was successful or not. In an example, success is declared if the eye is detected and/or if the confidence level of this detection is larger than a predefined threshold. If success is declared, block 1408 follows block 1406 to determine a position corresponding to the eye within the active area of the image sensor. Otherwise, either block 1402 or block 1450 follows block 1406.

Various techniques are possible to determine the confidence level. In one example, the confidence level represents the accuracy (or inverse of the error) of the image analysis algorithm for detecting the eye. In another example, the eye tracking system maintains historical data about the eye detection (e.g., contour, size, position, etc.). If there is a sudden change in the historical data (e.g., a size change between two image frames is larger than a threshold), the eye tracking system declares a low confidence level.

Looping back to block 1402 represents accessing another DFS image that shows the eye, where this other DFS image is generated in a next image frame and is used to attempt the eye detection again in the next image frame. Following block 1450 represents a strategy for estimating the position corresponding to the eye without having to rely on the next image frame. In an example, the other image is the full image sensor and is processed to detect the eye and estimate the eye's position. The estimation in this example can follow a similar set of operations as described under block 1408.

At block 1408, the eye tracking system determines the position corresponding to the eye within the active area of the image sensor. In an example, the eye tracking system translates the location of the detected contour and/or center of the eye in the DFS image to corresponding pixels of the image sensor (e.g., to coordinates of these pixels). The positions of these pixels (e.g., their coordinates) represent the position corresponding to the eye within the active area.

At block 1410, the eye tracking system positions an ROI around the position corresponding to the eye. In an example, positioning the ROI includes defining a geometry, a size, and a position of the ROI. A basic geometric shape can be used, such as a rectangle, square, or circle having a particular width, height, or diameter (as applicable). The width, height, or diameter is defined such that the shape contains the eye (e.g., the pixels that correspond to the eye) with a certain margin (e.g., the geometric shape is up to twenty percent larger than the eye). The position of the ROI can be centered around the position corresponding to the eye (e.g., the ROI is centered around the pixel that corresponds to the center of the eye). Accordingly, the eye tracking system identifies a subset of the pixels of the image sensor to read out, where this subset corresponds to the ROI within the active area.

At block 1412, the image sensor reads out the subset of the pixels of the image sensor. In an example, the eye tracking system receives the pixel values that were read out and generates an ROI image based on these values. This subset of the pixels are read out in a second image frame (whereas the DFS image was generated in the first image frame). In a particular example, during the second image frame, the set of BP illuminators or a set of DP illuminators is turned on and the image sensor reads out the subset of pixels. Hence, the ROI image is a BP ROI image or a DP ROI image that is available from the second image frame and that was centered around the location of the eye determined in the first image frame.

At block 1414, the eye tracking system detects a pupil of the user from the ROI generated at block 1412. In an example, the detection involves applying an image analysis algorithm, such as an edge detection algorithm, to the ROI image to determine, for instance, a contour and a center of the pupil shown in the ROI image.

At block 1416, the eye tracking system determines whether the detection of the pupil was successful or not. In an example, success is declared if the pupil is detected and/or if the confidence level of this detection is larger than a predefined threshold. If success is declared, block 1418 follows block 1416 to determine a position corresponding to the pupil within the active area of the image sensor. Otherwise, either block 1408 or block 1460 follows block 1416. Maintaining a confidence level can be similar to block 1406 (e.g., based on the accuracy of the image analysis algorithm or a history of the pupil detection). The confidence level can also be maintained based on a brightness contrast between the pupil or the iris. For instance, the smaller the brightness contrast, the lower the confidence level is. As such, a sudden change to a detected size of the pupil between image frames or a low brightness contrast between the pupil and the iris of the eye shown in the ROI image indicates a low confidence level.

Looping back to block 1408 represents determining an updated position of the eye from the ROI image in the second image frame to reposition the ROI around the updated position in a next image frame (e.g., a third image frame). Following block 1460 represents a strategy for estimating the position corresponding to the pupil without having to rely on the next image frame. Various implementations of this strategy are possible.

In one example implementation, the ROI image used at block 1414 is an BP ROI image. Accordingly, at block 1460, the position corresponding to the pupil is determined from a DP ROI image instead, where this DP ROI image was generated in a previous image frame (e.g., the closest preceding image frame). Alternatively, the ROI image used at block 1414 is the DP ROI image. Accordingly, at block

1460, the position corresponding to the pupil is determined from the BP ROI image instead, where this BP ROI image was generated in the previous image frame. Yet in another example, the position corresponding to the pupil is determined from the DFS image or from the full sensor image.

In a further example of estimating the pupil's position under operation 1460, this position is determined based on a second position corresponding to a second pupil of the user. For instance, the process 1400 is similarly applied to detect a second eye of the user and a second pupil of the second eye and to position a second ROI around the second pupil and/or second eye. Accordingly, in the second image frame, the second pupil may have been successfully detected and its corresponding second position determined. The eye tracking system uses geometric construction given the second position, an interocular distance between the eyes, and the distance between the eye and the image sensor to estimate the position corresponding to the pupil. Yet another example for estimating the pupil's position relies on predicting this position given historical data about the position corresponding to the pupil over time, as further described in FIG. 15.

At block 1418, the eye tracking system determines the position corresponding to the pupil within the active area of the image sensor. In an example, the eye tracking system translates the location of the detected contour and/or center of the pupil in the ROI image to corresponding pixels of the image sensor (e.g., to coordinates of these pixels). The positions of these pixels (e.g., their coordinates) represent the position corresponding to the pupil within the active area.

At block 1420, the eye tracking system repositions the ROI around the position corresponding to the pupil. In an example, re-positioning the ROI includes updating the geometry, size, and/or position of the ROI. For example, the shape can be made smaller than what was defined at block 1410 such that the shape contains the pupil (e.g., the pixels that correspond to the pupil) with a certain margin (e.g., the geometric shape is up to twenty percent larger than the pupil). The position of the ROI can be centered around the position corresponding to the pupil (e.g., the ROI is centered around the pixel that corresponds to the center of the pupil). Accordingly, the eye tracking system identifies a subset of the pixels of the image sensor to read out, where this subset corresponds to the ROI within the active area.

At block 1422, the image sensor reads out the subset of the pixels of the image sensor. In an example, the eye tracking system receives the pixel values that were read out and generates an ROI image based on these values. This subset of the pixels are read out in a third image frame (whereas the ROI image of block 1412 was generated in the second image frame). In a particular example, during the third image frame, the set of BP illuminators or the set of DP illuminators is turned on and the image sensor reads out the subset of pixels. Hence, the ROI image is a BP ROI image or a DP ROI image that is available from the third image frame and that was centered around the location of the pupil determined in the third image frame.

The process 1400 loops back to block 1414, where the eye tracking system detects the pupil from the ROI image generated at block 1422. Within this next iteration, the position of the pupil is updated as applicable, thereby updating also the position of the ROI as needed. In addition to updating the position of the ROI, the geometric shape and/or size of the ROI can be updated to reduce the number of pixels that should be processed, thereby reducing the processing and power consumption. In an example, the ROI defined around the pupil can start as a rectangle of a particular size, over time, its size reduced or shape changed (e.g., to a circle). Furthermore, the illumination of the eye can vary between the iterations. For example, in one iteration, the BP illuminators are turned on to generate a BP ROI image and, in the next iteration, the DP illuminators are turned on to generate a DP ROI image.

Figure 15:
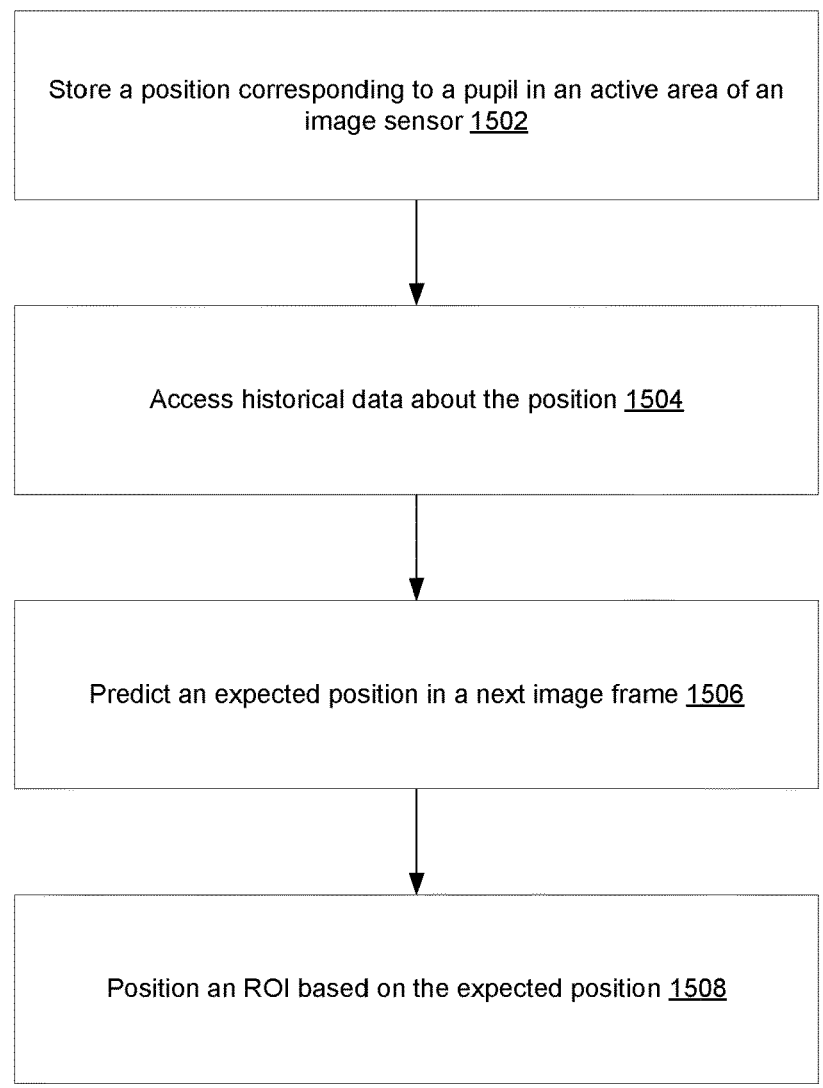
FIG. 15 illustrates an example process for positioning an ROI around an expected position corresponding to the pupil in the active area of the image sensor.

FIG. 15 illustrates an example process 1500 for positioning an ROI around an expected position corresponding to the pupil in the active area of the image sensor, according to an embodiment of the present disclosure. The eye tracking system can perform the blocks of the process 1500. Some of the blocks or operations thereof can be implemented as sub-blocks or sub-operations of the processes 1300 and 1400 of FIGS. 13 and 14.

The process 1500 starts at block 1502, where the eye tracking system stores the position corresponding to the pupil. In an example, once the position is determined at block 1418 of process 1400, the computer system stores this position in memory, thereby maintaining a history of positions corresponding to the pupil over time.

At block 1504, the eye tracking system accesses historical data about the position. In an example, the eye tracking system accesses the history maintained in the memory. The full history or only a statistically sufficient subset thereof may be used. For instance, the historical positions determined in a previous set of image frames (e.g., the last ten image frames) are accessed.

At block 1506, the eye tracking system predicts an expected position corresponding to the pupil in the active area, where this position is predicted for the next image frame. In an example, the eye tracking system hosts a predictive model (e.g., a regression model, a machine learning algorithm, etc.) or interfaces with a computer system that hosts such a model. The historical data is input to the predictive model. In response, the expected position is received.

At block 1508, the eye tracking system positions (or repositions) an ROI based on the expected position. In an example, the ROI is centered around the expected position.

In an example, some of the blocks of the process 1500 can be performed in lieu of some of the blocks of the process 1400 to reduce the processing. In particular, the process 1400 can be initiated and used until a statistically sufficient set of historical data about the position is stored. From that point on, the process 1500 can be initiated and blocks 1504-1506 iteratively used instead of the block 1420 of the process 1400, until a failure of detecting the pupil occurs.

In addition to tracking the position corresponding to the pupil and repositioning the ROI between image frames, the tracking and repositioning can also rely on image bursts. Generally, an image burst represents multiple image frames, and each image frame can include one or more images.

Figure 16:
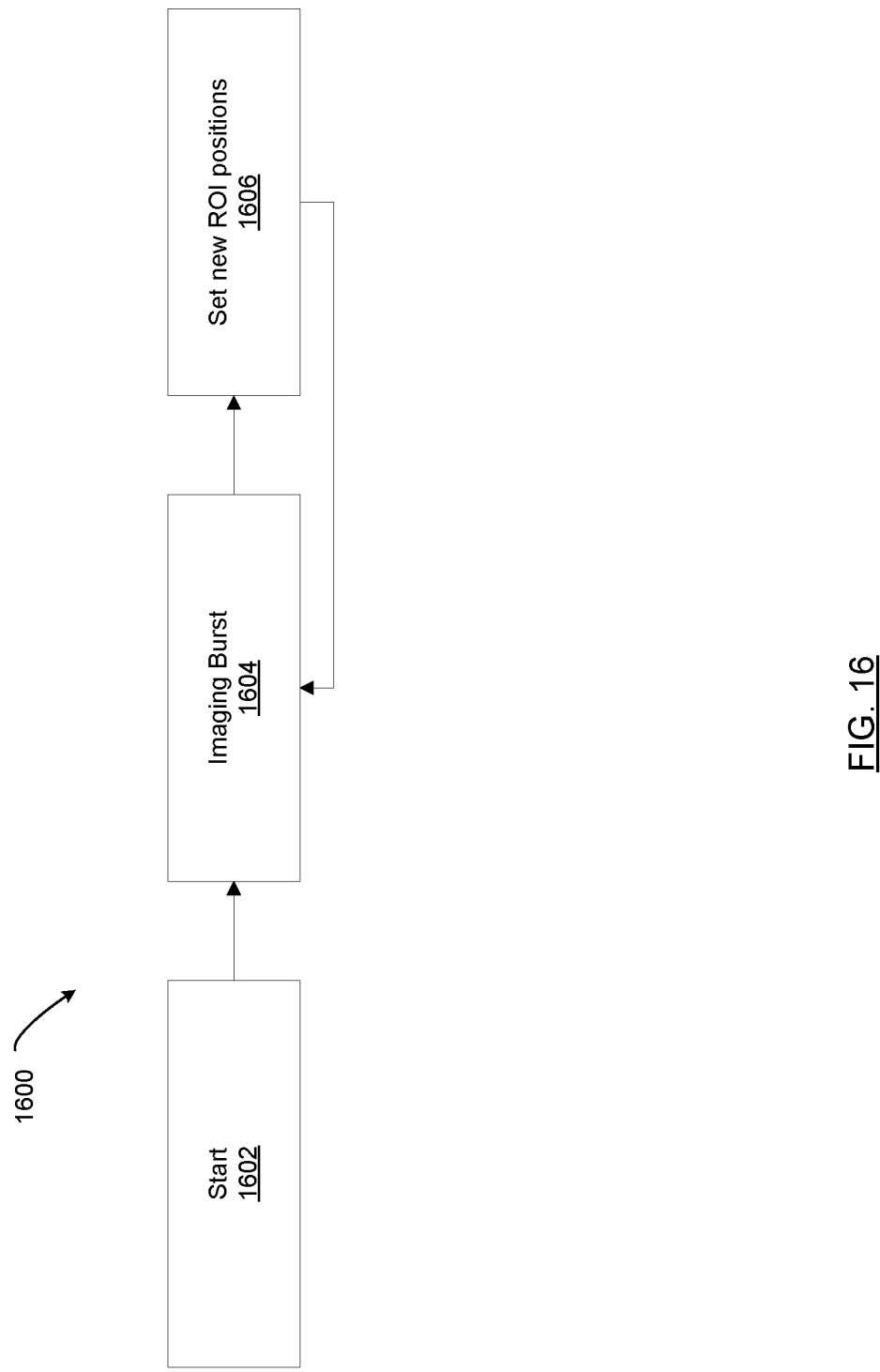
FIG. 16 illustrates an example of positioning ROIs based on image bursts.

FIG. 16 illustrates an example of positioning ROIs based on image bursts. Generally, the positioning follows three stages: a start 1602, an image burst 1604, and a setting of new ROI positions 1606. The ROI is positioned in an image burst based on ROI images generated in a previous image burst.

In an example, the start 1602 corresponds to a powering on of an eye tracking system or a user command to initiate content presentation on a user interface, such as a display. The eye tracking system includes a camera having an image sensor and implements the pupil detection and ROI positioning techniques described herein.

The imaging burst 1604 typically includes multiple image frames that cover multiple images with different illuminations and sensor readouts. For example, the imaging burst 1604 includes three image frames with different illuminations and different sensor readouts: a DFS frame, a BP ROI frame, and a DP ROI frame. During the DFS frame, a set of BP illuminators is turned on, a full image sensor is captured, and a DFS image is generated from the full sensor image. During the BP ROI frame, a same or different set of BP illuminators is turned on, and two ROI images (each associated with an eye) are captured. During the DP ROI frame, a set of DP illuminators is turned on, and two ROI images (each associated with an eye) are captured. Other examples of sequencing the illuminations and reading out the values of the pixels of the image sensor are further illustrated in FIG. 17.

The setting of new ROI positions 1606 generally involves the eye tracking system detecting each pupil from a current image burst and defining an ROI centered around the pupil to enable capturing a corresponding ROI image in the next image burst. Generally, an image of an ROI previously centered around the pupil (e.g., BP ROI image or DP ROI image) is used from the current image burst to detect the pupil (or any change to its position). If this detection is not possible, the eye position is detected from another image (e.g., a DFS image) available from the current image burst to define an ROI around the eye and generate an ROI image of the eye.

In an example, the eye tracking system determines the position and contour of the pupil from an image burst, and translates them into a first subset of pixels within the active area of the image sensor. The eye tracking system then defines the ROI as a second subset of pixels on the active area, where this second subset contains and is centered around the first subset corresponding to the pupil. In the next image burst, the image sensor reads outs the pixels belonging to the second subset, thereby generating an ROI image of the pupil usable for gaze detection.

A similar definition can be made for an ROI centered around the eye to generate an ROI image of the eye. This image can be used to detect the pupil (e.g., its position and contour), for subsequent definition of an ROI around the pupil.

A feedback loop exists between the setting of the ROI positions 1606 and the imaging burst 1604. This feedback allows the eye tracking system to reposition the ROIs as needed.

In an example, the eye tracking system selects to generate and/or process a DP and BP ROI image in an image burst depending on a priority of the images. Furthermore, the eye tracking system detects gaze and repositions the ROI for a next image burst based on a confidence level of detecting the pupil. The priority indicates that the BP ROI image should be selected initially and that the DP ROI image should be selected subsequently if the pupil is undetectable in the BP ROI image. The confidence level indicates that either the BP ROI image or the DP ROI image is usable if the confidence level of detecting the pupil exceeds a confidence threshold. The confidence level of detecting the pupil is updated based on at least one of: a change to a detected size of the pupil between image bursts or a brightness contrast between the pupil and an iris of the eye shown in images bursts, or other parameters (such as the error margin).

Figure 17:
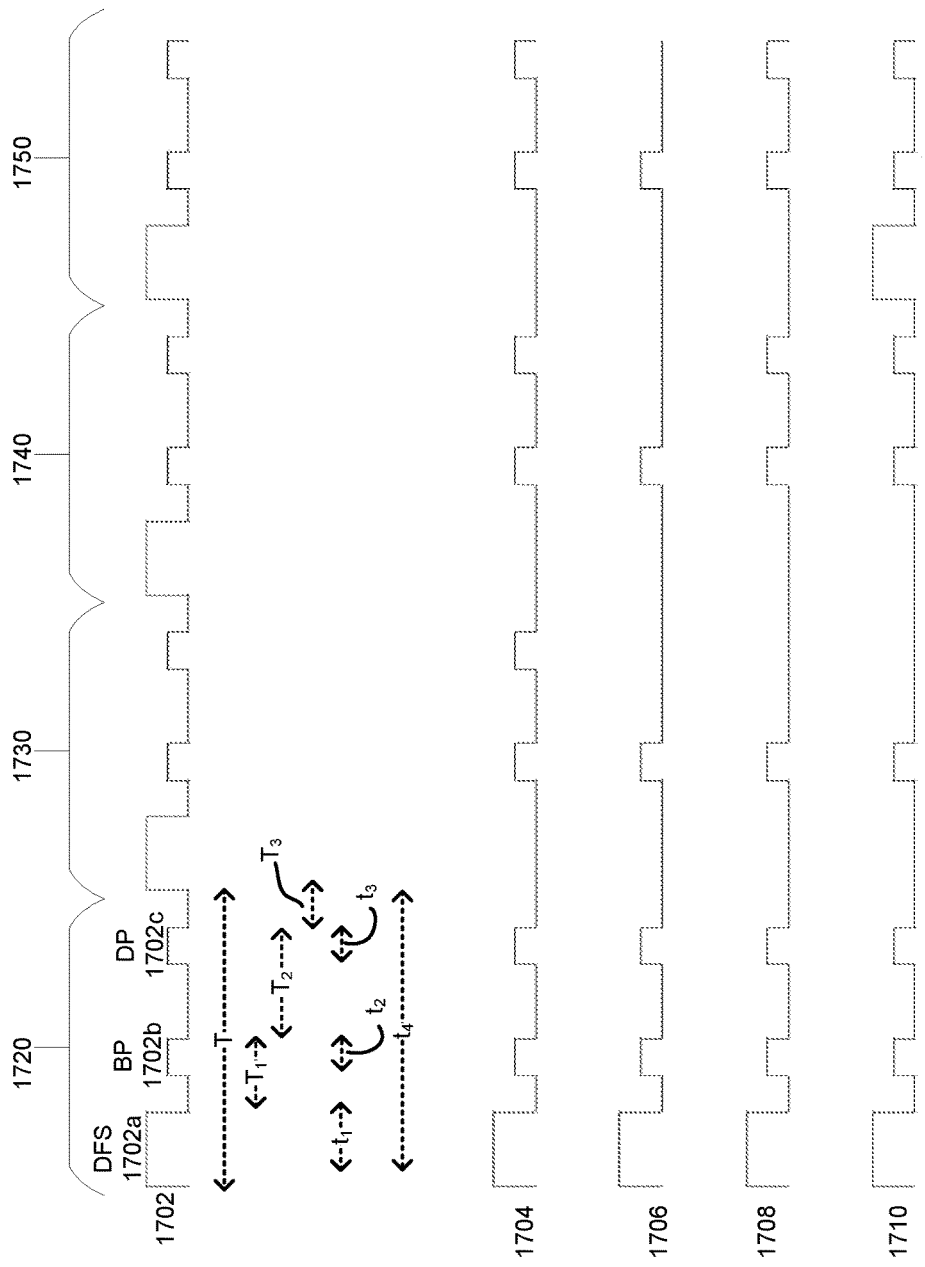
FIG. 17 depicts an example of timing diagrams for processing image bursts.

FIG. 17 depicts an example of timing diagrams for processing image bursts. For example, a first image burst may contain a DFS frame (containing a DFS image), a BP frame, and a DP frame. FIG. 17 illustrates a single BP ROI image and a single DP ROI image in the BP frame and the DP frame, respectively. These images can correspond to one eye (e.g., the left eye). The two image frames can also include the corresponding ROI images for the other eye. In one aspect, each timing diagram is illustrated over four image bursts 1720, 1730, 1740, and 1750. Other combinations of image bursts, images frames, images, sequences, and timing are also possible.

In some embodiments, a full sensor image with a resolution of at least about 2240 pixels in height and about 2240 pixels in width may be down-sampled to generate a DFS image having a dimension of 1660 pixels in height and 1660 pixels in width. Other down-sampling factors can be similarly used. For example, a down-sampling of two or four is possible.

At timing diagram 1702, an example of a first image processing method may be characterized by multiple image processing steps within an image burst. Generally a timing diagram includes multiple image bursts. The image bursts may, but need not, be the same. Within each image burst, sequences and timing for generating and processing the images are defined.

As illustrated, timing diagram 1702 may be characterized by generating and processing DFS 1702a (in a DFS frame), a BP ROI image 1702b (in a BP ROI frame), and a DP ROI image 1702c (in a DP ROI frame) during each of image bursts 1720, 1730, 1740, and 1750. As illustrated in timing diagram 1702, performing processing operations on DFS image 1702a is more resource intensive, which may be represented by the relative height of the peak, or a longer process, which may be represented by the relative width of the peak. Accordingly, processing operations for BP ROI 1702b and DP ROI 1702c images are shown characterized by a relative height and width based in part on the resources and time required to perform processing.

In an example, the width of the DFS image 1702a corresponds to a readout time "$t_1$." Similarly, the width of the BP ROI image 1702b corresponds to a readout time "$t_2$" and the width of the DP ROI image 1702c corresponds to a readout time "$t_3$." "$t_4$" is the maximum time limitation for updating an ROI position. "$T_1$" represents the processing time of the DFS image, "$T_2$" the processing time of the BP ROI image, and "$T_3$" the processing time of the DP ROI image. "T" is one cycle time of one image burst.

The values of these times can be defined to support a particular frame rate and particular image resolutions and dimensions. For example, "T" can be set to /160 seconds to support a 60 Hz frame rate. The remaining times could be set depending on the underlying read time capability of the image sensor, processing power of the eye tracking system, and resolution and dimensions of the images.

As illustrated, the processing time of the DFS image starts from the end of the reading out DFS image until the end of BP ROI image; the processing time of the BP ROI image starts from the end of the reading out of DP ROI image; the processing time of the DP ROI image starts from the end of reading out of DP ROI image until the END of "$t_4$."

Of course, other variations to the timing diagrams are possible, some of which are illustrated in FIG. 17. For instance, the sequence of image capture of BP ROI image and DP ROI image can be reversed. Moreover, the processing time for DFS image, BP ROI image and DP ROI image can be shortened. For example, the processing of DFS image may be finished prior to the start of the capture of BP ROI image; and the processing of BP ROI image may be finished prior to the start of the capture of DP ROI image; and the processing of DP ROI image may be finished prior to the end of "$t_4$." Alternatively, the processing of DFS image may be finished during the capture of BP ROI image; the processing of BP ROI image may be finished during the capture of DP ROI image; and the processing time of DP ROI image may be identical as the processing time of BP ROI image or alternatively the processing time of DP ROI image may be different from the processing time of BP ROI image.

At timing diagram 1704, an example of a second processing method may be characterized by multiple processing steps within an image burst. As illustrated, timing diagram 1704 may be characterized by generating and processing of DFS, BP ROI, and DP ROI images during an image burst 1720 and omitting the generation and processing of DFS images and only generating and processing BP and DP ROI images during image bursts 1730, 1740, and 1750.

At timing diagram 1706, an example of a third processing method may be characterized by multiple processing steps within an image burst. As illustrated, timing diagram 1706 may be characterized by generating and processing of DFS, BP ROI, and DP ROI images during an image burst 1720, omitting the generation and processing of DFS and DP ROI images and only generating and processing BP images during image bursts 1730, 1740, and 1750.

At timing diagram 1708, an example of a fourth processing method may be characterized by multiple processing steps within an image burst. As illustrated, timing diagram 1708 may be characterized by generating and processing of DFS, BP ROI, and DP ROI images during an image burst 1720 and omitting the generation and processing of DFS and DP ROI images and only generating and processing BP ROI images during an image burst 1730. In some cases, processing operations on the BP ROI image is unable to detect gaze, for example, during the image burst 1730. Accordingly, subsequent image bursts 1740 and 1750 may include generating and processing BP ROI and DP ROI images.

At timing diagram 1710, an example of a fifth processing method may be characterized by multiple processing steps within an image burst. As illustrated, timing diagram 1710 may be characterized by generating and processing DFS, BP ROI, and DP ROI images during an image burst 1720 and omitting the generation and processing of DFS and DP ROI images and only generating and processing BP ROI images during an image burst 1730. In some embodiments, an image burst may be characterized by a DFS image, a BP image, and a DP image, however processing only a BP image during the image burst 1730. In some cases, processing operations on the BP ROI image is unable to detect gaze, for example, during the image burst 1730. Accordingly, the subsequent image burst 1740 may include generating and processing BP ROI and DP ROI images. In some cases, processing operations on the BP image and DP image also fails to detect gaze. In this case, the subsequent image burst 1750 may include generating and processing of DFS, BP ROI image, and DP ROI images.

As explained herein above, different timing diagrams are possible, each of which may define a sequence, timing, and type of images in read cycles. Generally, a BP or DP image in an image burst is used to detect the pupil, determine its center position in the image, and translates this position to a position on the active area of the image sensor (e.g., to a particular subset of pixels). The eye tracking system defines an ROI having a particular shape (e.g., a rectangle, square, circle, or other geometric shape) and dimension (e.g., to be larger than the pupil by a certain margin, such as by up to twenty percent larger than the pupil) and centers this ROI around the position on the active area of the image sensor (e.g., identifies a subset of pixels on the active area, where this subset corresponds to the ROI). In the next read cycle, the image sensor generates an image confined to the ROI (e.g., a BP or DP ROI image), that the eye tracking system uses for the gaze detection.

In comparison, a larger dimension image (e.g., in width and/or height) is used to detect the position of the eye. This image can be used to support initial detection and failure recovery. With respect to the initial detection, the eye tracking system determines the position of the eye from the larger dimension image generated in the initial burst and defines an ROI around the center of the eye for the next image burst. In the next image burst, an ROI image of the eye is generated and is used to detect the pupil and define an ROI around the pupil. With respect to the failure recovery, if the eye tracking system cannot detect the pupil from a BP or DP ROI image in an image burst, the larger dimension image in that image burst (or a proximate one, such as an immediately preceding or subsequent one) is used to detect the eye and define the eye ROI that is used to subsequently detect the pupil and define the pupil ROI.

Based on the images, different implementation strategies are possible. A first implementation strategy optimizes processing latency (e.g., reduces it as much as possible). In particular, each image burst includes the DFS image, BP ROI images, and DP ROI images as illustrated in the timing diagram 1702. Each of these images is processed and, as needed, subsequently used. For example, the BP ROI image is used to detect the pupil's position. If the detection is successful, the ROI for the next image burst is centered around the detected position of the pupil. If the detection fails, the DP ROI is used to detect the pupil's position and centered the ROI for the next image. However, if the detection fails again, the DFS image is used to detect the eye and define the eye ROI for the next image burst. Accordingly, if there is a failure, the latency to detect the pupil again is reduced because the various images are already processed.

A second implementation strategy optimizes the computational burden (e.g., reduces it as much as possible). In particular, each image is generated and processed only as needed. For example, once an ROI is positioned around a pupil, a BP ROI image is only generated and processed in an image burst. Only if the pupil is not detected, a DP ROI is generated and processed in the next image burst. Here also, only if the pupil is still not detected, a DFS image is only generated and processed in the following image burst. Accordingly, the computational burden is reduced because only the minimum number of images is generated and processed.

A third implementation strategy could be a hybrid of the above two strategies to balance latency and computational burden. For example, the type and number of images within each cycle can vary depending on whether a pupil was detected or not.

In addition to varying the type of images in each read cycle to increase the likelihood of detecting a pupil and position an ROI around it, other parameters can be varied. In one example, the dimension of the ROI can be changed. For instance, if in a current image burst, the pupil is not detected from a BP or DP ROI image confined to an ROI having a particular dimension, its dimension may be increased in the next image burst.

The position of the ROI may stay the same between the image bursts and/or may be shifted. If shifted, the shift may be random and limited to a certain number of pixels (e.g., no more than ten pixels of the active area of the image sensor). Alternatively, the shift can be based on the history of the pupil movement. In particular, the eye tracking system can store in memory the position of the pupil as detected in each image burst. If the position is no longer detected in a current image burst, the positions from a previous set of image bursts (e.g., the last ten positions) are accessed from the memory to predict the undetected position of the pupil. The ROI is then shifted to the predicted position.

Beyond changing the dimension and/or position of the ROI, another parameters that can be considered is the position of the other pupil of the user, the interocular distance between the eyes, the distance between the eye and the image sensor, and the head orientation (e.g., available based on sensors of a virtual reality headset for example). In particular, if the position of the other pupil is detected from a corresponding ROI image in a current image burst, the eye tracking system uses geometric construction given the interocular distance between the eyes, the distance between the eye and the image sensor, and the head orientation to estimate the position of the undetected pupil and repositions the ROI for this pupil around the estimated position.

The eye tracking system can also use confidence level to determine whether a success or a failure should be declared for detecting the pupil in an ROI image. In one example, the eye tracking system uses an image processing analysis (e.g., edge detection, pattern recognition, etc.) to detect the pupil from the ROI image. An output of the image processing analysis is an error margin. The eye tracking system generates the confidence level from this error margin (e.g., the confidence level is the inverse of the error margin). If the confidence level is larger than a predefined threshold, success is declared. Otherwise, failure is declared.

In another example, the eye tracking system maintains a history of the detected dimension and/or position of the pupil. If there is a sudden change to the dimension and/or position between two image bursts and this change is larger than a threshold (e.g., the dimension of the pupil increased from a ten pixel diameter to a fifty pixel diameter), the eye tracking system declares a detection failure. In this example, the eye tracking system can maintain a confidence level depending on the change. For instance, ranges for the change are predefined and each is mapped to a confidence level.

In yet another example, the tracking system sets the confidence level as a function of the brightness contrast between the pupil and an iris of the eye shown in images bursts. In particular, the image analysis can measure the brightness (e.g., may involve a luminance histogram) of the pupil and the iris. The difference between the two indicates a contrast. The smaller the contrast, the less the confidence level is.

When multiple ROI images are available in an image burst (e.g., BP and DP ROI images), the eye tracking system may select one of these images based on the associated confidence levels (e.g., select the one having the highest confidence level) for the pupil's position detection and repositioning of the ROI. Alternatively, the eye tracking system can use a weighted combination of these images based on their confidence levels. For instance, the detected position from each image is weighted as a function of the confidence level to generate a weighted average of the pupil's position and accordingly reposition the ROI.

Figure 18:
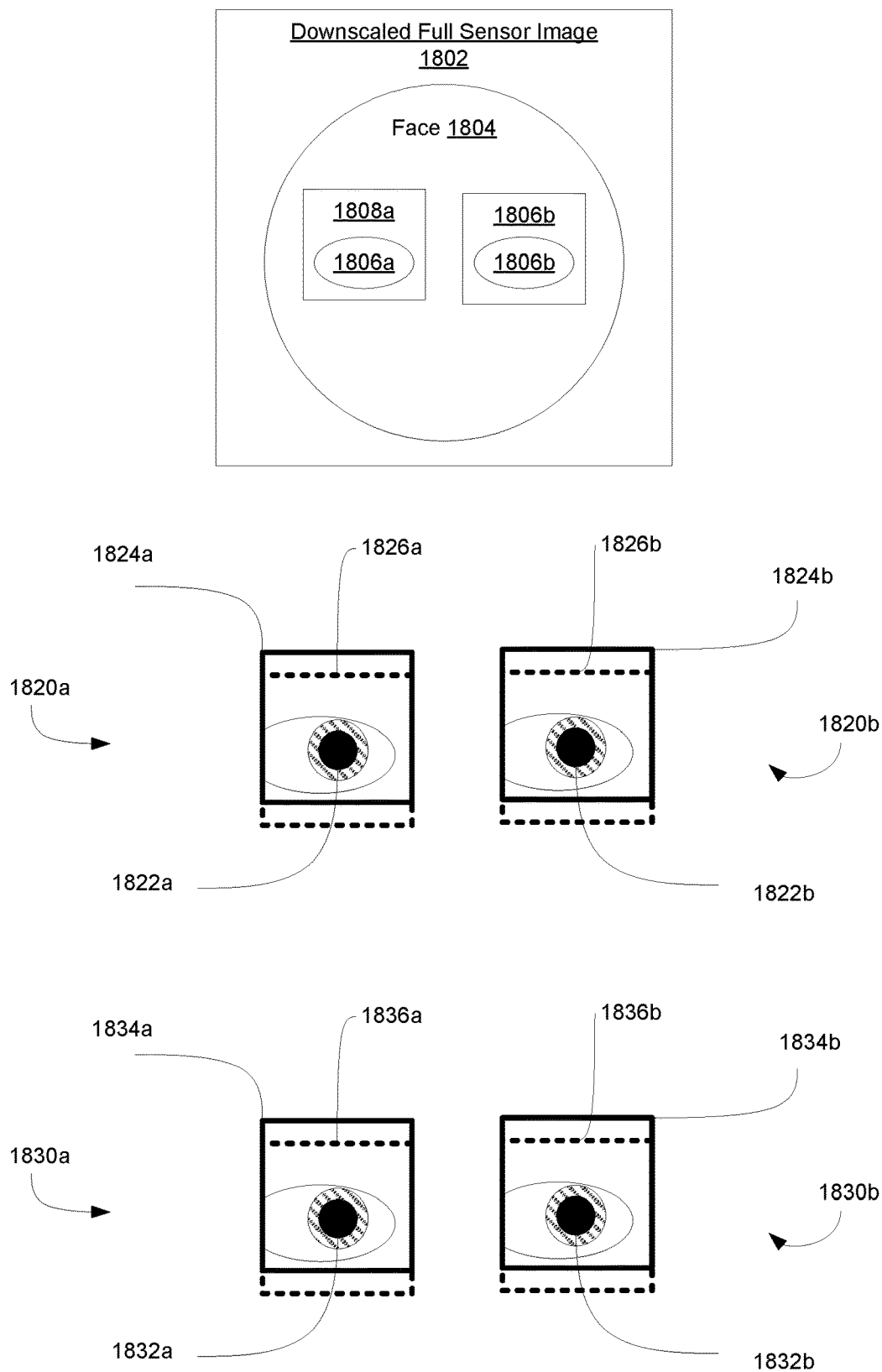
FIG. 18 illustrates an image burst that includes a downscaled full sensor image, a bright pupil ROI image per pupil, and dark pupil ROI image per pupil.

FIG. 18 illustrates an image burst that includes a downscaled full sensor image, a bright pupil ROI image per pupil, and dark pupil ROI image per pupil, according to an embodiment of the present disclosure. As illustrated, a DFS image 1802 shows a face 1804 and two eyes 1806a and 1806b of a user (e.g., of course other variations are possible, where the DFS image may show only a portion of a face or only one eye). An eye tracking system detects the eyes 1806a and 1806b and their positions from the DFS image 1802. The eye tracking system defines an ROI 1808a for the eye 1806a, such that the ROI 1808a is centered around and contains the eye 1806a. Similarly, the eye tracking system defines an ROI 1808b for the eye 1806b, such that the ROI 1808b is centered around and contains the eye 1806b.

As further illustrated, a BP ROI image 1820a is generated for a bright pupil 1822a of the eye 1806a. The BP ROI image 1820a has a smaller dimension than that of the DFS image 1802. In addition, the BP ROI image 1820a is confined to an ROI 1824a and may not show the entire eye 1806a. In other words, the dimension the BP ROI image 1820a is defined and limited by the dimension of the ROI 1824a and depending on how big and the position of the ROI 1824a, only a portion of the eye 1806a may be shown. In an example, the eye tracking system detects the bright pupil 1822a in the BP ROI image 1820a and repositions the ROI 1824a to a new position (shown with a dashed line as ROI 1826a) that is centered around the detected bright pupil 1822a. In an next image burst, a new BP ROI image is generated for the bright pupil 1822a, where this BP ROI image is confined to the repositioned ROI 1826a.

Similarly, a BP ROI image 1820b is generated for a bright pupil 1822b of the eye 1806b. The BP ROI image 1820b may, but need not, have the same dimension as the BP ROI 1820a. In addition, the BP ROI image 1820b is confined to an ROI 1824b and may not show the entire eye 1806b. In an example, the eye tracking system detects the bright pupil 1822b in the BP ROI image 1820b and repositions the ROI 1824b to a new position (shown with a dashed line as ROI 1826b) that is centered around the detected bright pupil 1822b. In an next image burst, a new BP ROI image is generated for the bright pupil 1822b, where this BP ROI image is confined to the repositioned ROI 1826b.

As further illustrated, a DP ROI image 1830a is generated for a dark pupil 1832a of the eye 1806a. The DP ROI image 1830a has a smaller dimension than that of the DFS image 1802. The DP ROI image 1830a may, but need not, have the same dimension as the BP ROI 1820a In addition, the DP ROI image 1830a is confined to an ROI 1834a and may not show the entire eye 1806a. In other words, the dimension of the DP ROI image 1830a is defined and limited by the dimension of the ROI 1834a and depending on how big and the position of the ROI 1834a, only a portion of the eye 1806a may be shown. In an example, the eye tracking system detects the dark pupil 1832a in the DP ROI image 1823a and repositions the ROI 1834a to a new position (shown with a dashed line as ROI 1836a) that is centered around the detected dark pupil 1832a. In an next image burst, a new DP ROI image is generated for the dark pupil 1832a, where this DP ROI image is confined to the repositioned ROI 1836a.

Similarly, a DP ROI image 1830b is generated for a dark pupil 1832b of the eye 1806b. The DP ROI image 1830b may, but need not, have the same dimension as the DP ROI 1830a. In addition, the DP ROI image 1830b is confined to an ROI 1834b and may not show the entire eye 1806b. In an example, the eye tracking system detects the dark pupil 1832b in the DP ROI image 1830b and repositions the ROI 1834b to a new position (shown with a dashed line as ROI 1836b) that is centered around the detected dark pupil 1832b. In an next image burst, a new DP ROI image is generated for the dark pupil 1832b, where this DP ROI image is confined to the repositioned ROI 1836b.

In the above description, a single ROI may be defined for a pupil based on a detected position of the pupil from either a BP ROI image or a DP ROI image. In other words, the repositioned ROI 1826a can be used to capture both the new BP ROI image and the new DP ROI image in the next image burst.

FIGS. 19-22 illustrate example processes for positioning an ROI. An eye tracking system is described as performing blocks of the processes. Instructions for performing the blocks can be stored as computer-readable instructions on a non-transitory computer-readable medium of the eye tracking system. As stored, the instructions represent programmable modules that include code or data executable by a processor(s) of the eye tracking system. The execution of such instructions configures the eye tracking system to perform the specific operations shown in the figures and described herein. Each programmable module in combination with the processor represents a means for performing a respective operation(s). While the operations are illustrated in a particular order, it should be understood that no particular order is necessary and that one or more operations may be omitted, skipped, and/or reordered.

Figure 19:
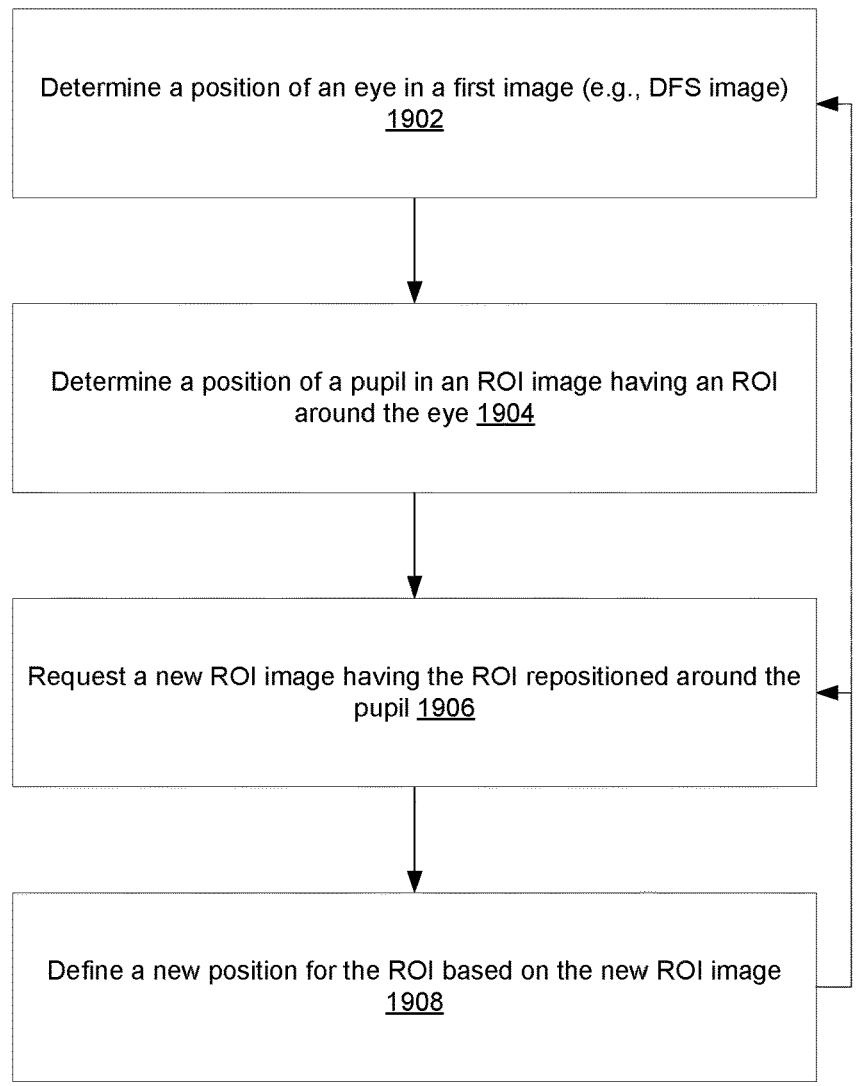
FIG. 19 illustrates an example of a process for positioning an ROI based on image bursts.

FIG. 19 illustrates an example of a process 1900 for positioning an ROI based on image bursts, according to an embodiment of the present disclosure. In the interest of clarity of explanation, this process is described in connection with a single pupil.

At block 1902, the eye tracking system determines a position of an eye in a first image. In an example, the first image is a DFS image and is received in a DFS frame of a first image burst from an image sensor associated with the eye tracking system.

At block 1904, the eye tracking system determines a position of a pupil of the eye in an ROI image that corresponds to an ROI defined around the eye. In an example, the ROI image is received in an ROI frame of a second image burst from the image sensor. The ROI image is generated based on the position of the eye determined in the first image such that the ROI image is centered around that position. For instance, upon determining the position of the eye, the eye tracking system centers the ROI around that position and instructs the image sensor to readout pixels corresponding to the ROI according to a particular illumination. Accordingly, in the second image burst, the ROI image is generated and is used to detect the pupil and its position. This ROI image can be a BP or DP ROI image of the eye, depending on the illumination.

At block 1906, the eye tracking system requests the image sensor to generate a new ROI image, where the ROI for this image is now centered around the position of the pupil. For example, the eye tracking system repositions the ROI such that it is centered around the pupil and is larger than the pupil by a predefined margin.

At block 1908, the eye tracking system defines a new position for the ROI based on the new ROI image. For example, the eye tracking system detects the position of the pupil in the new ROI image and repositions the ROI to this position for the next image burst. If the pupil could not be detected (e.g., a detection failure is declared), another ROI image showing the pupil would be used, another first image is used to detect the eyes and redefine an ROI, or an estimation of the position of the pupil is performed based on the position of the other pupil or the history of the pupil's movement as described herein above in connection with FIG. 17. The process loops back to block 1906 to continue the ROI repositioning, or to block 1902 if the pupil could not be detected.

Figure 20:
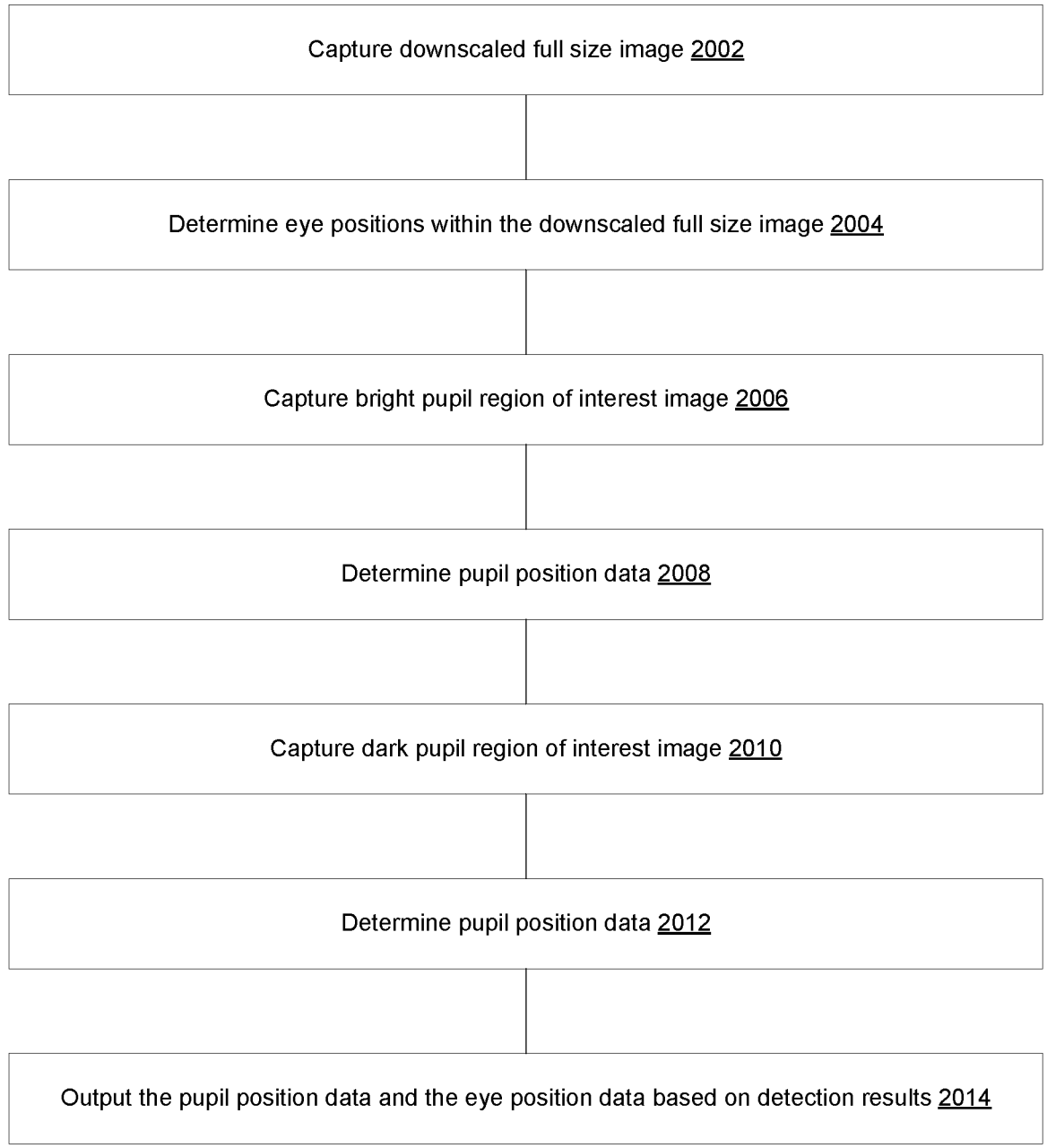
FIG. 20 illustrates an example of a process for determining pupil position data.

FIG. 20 illustrates an example of a process 2000 for determining pupil position data, using captured images and processing techniques described herein. At block 2002, the process 2000 involves capturing a DFS image. At block 2004, the process 2000 involves determining eye positions within the DFS image. For example, a DFS image may be an image with a resolution of about 1660 pixels in height and 1660 pixels in width, and may be processed to detect the presence and positions of the eyes.

At block 2006, the process 2000 involves capturing a BP ROI image. At block 2008, the process 2000 involves determining pupil position data from the BP ROI image.

At block 2010, the process 2000 involves capturing a DP ROI image. At block 2012, the process 2000 involves determining pupil position data from a DP ROI image.

At block 2014, the process 2000 involves outputting the pupil position data and eye position data based on detection results. For example, the data may be output to and stored in a memory associated with the eye tracking system.

Figure 21:
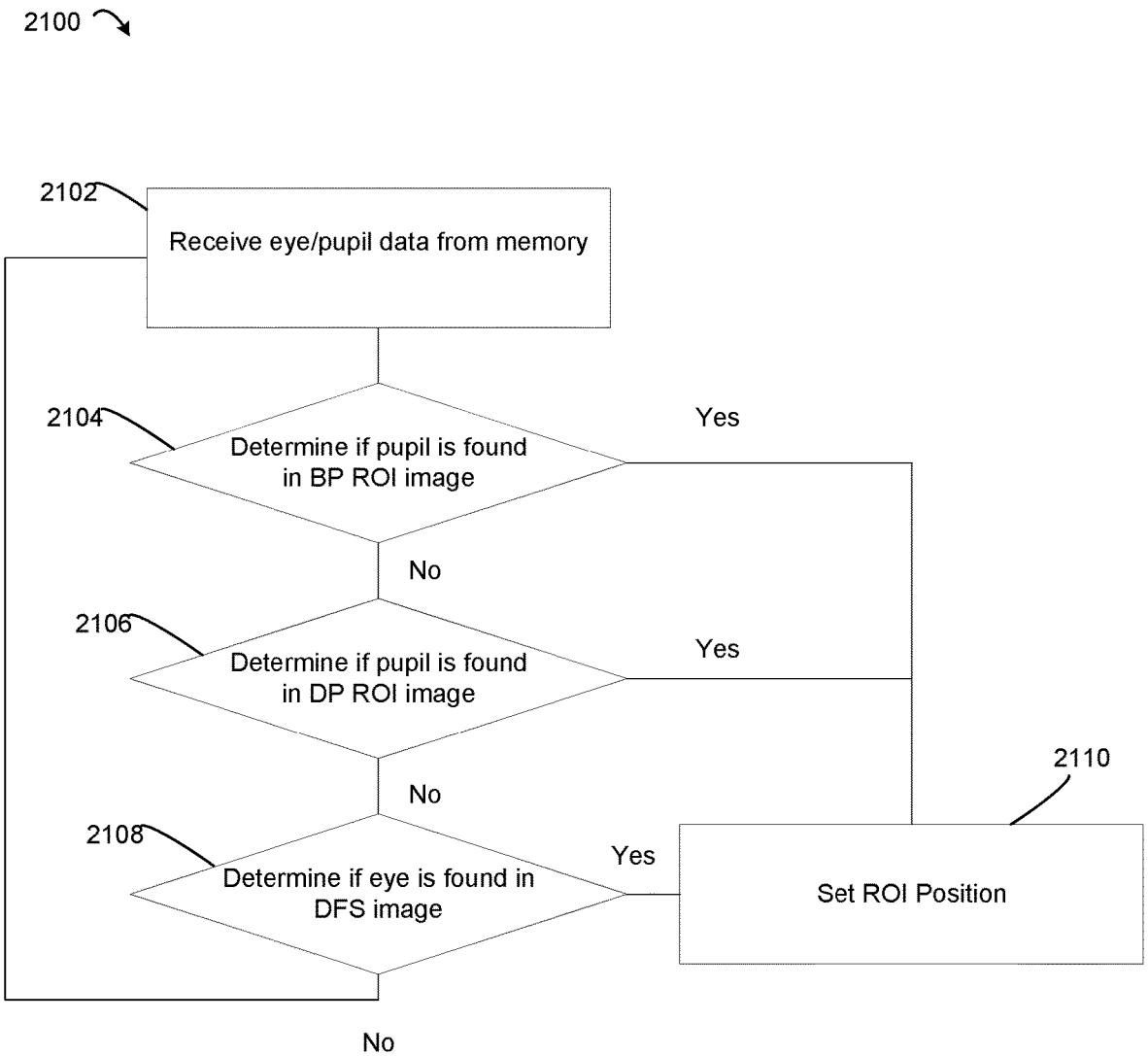
FIG. 21 is an example of a process for setting region of interest position using pupil position data.

FIG. 21 is an example of a process 2100 for setting region of interest position using pupil position data. At block 2102, the process 2100 involves receiving eye and/or pupil data from memory. In some embodiments, the eye or pupil data may include position, distance from a viewer, gaze point, or other types of eye or pupil data. For example, eye or pupil position may be received from a memory by a processor.

At block 2104, the process 2100 involves determining if a pupil is found in the BP ROI image. In some embodiments, if a pupil were detected in the BP ROI image, then the process 2100 would move to block 2110. In other embodiments, if a pupil were not detected in the BP ROI image, then the process 2100 would move to block 2106.

At block 2106, the process 2100 involves determining if a pupil is found in a DP ROI image. In some embodiments, if a pupil were detected in the DP ROI image, the process 2100 would move to block 2110. In other embodiments, if a pupil were not detected in the DP ROI image, then the process 2100 would move to block 2108.

At block 2108, the process 2100 involves determining if an eye is found in a DFS image. In some embodiments, if an eye were detected in the DFS image, then the process 2100 would move to block 2110. In other embodiments, if a pupil were not detected in the DFS image, then the process 2100 would move to block 2102.

At block 2110, the process 2100 involves setting ROI position. In some embodiments, an ROI is set by defining shape, dimension, and position of an ROI around the pupil if detected or the eye if detected.

Figure 22:
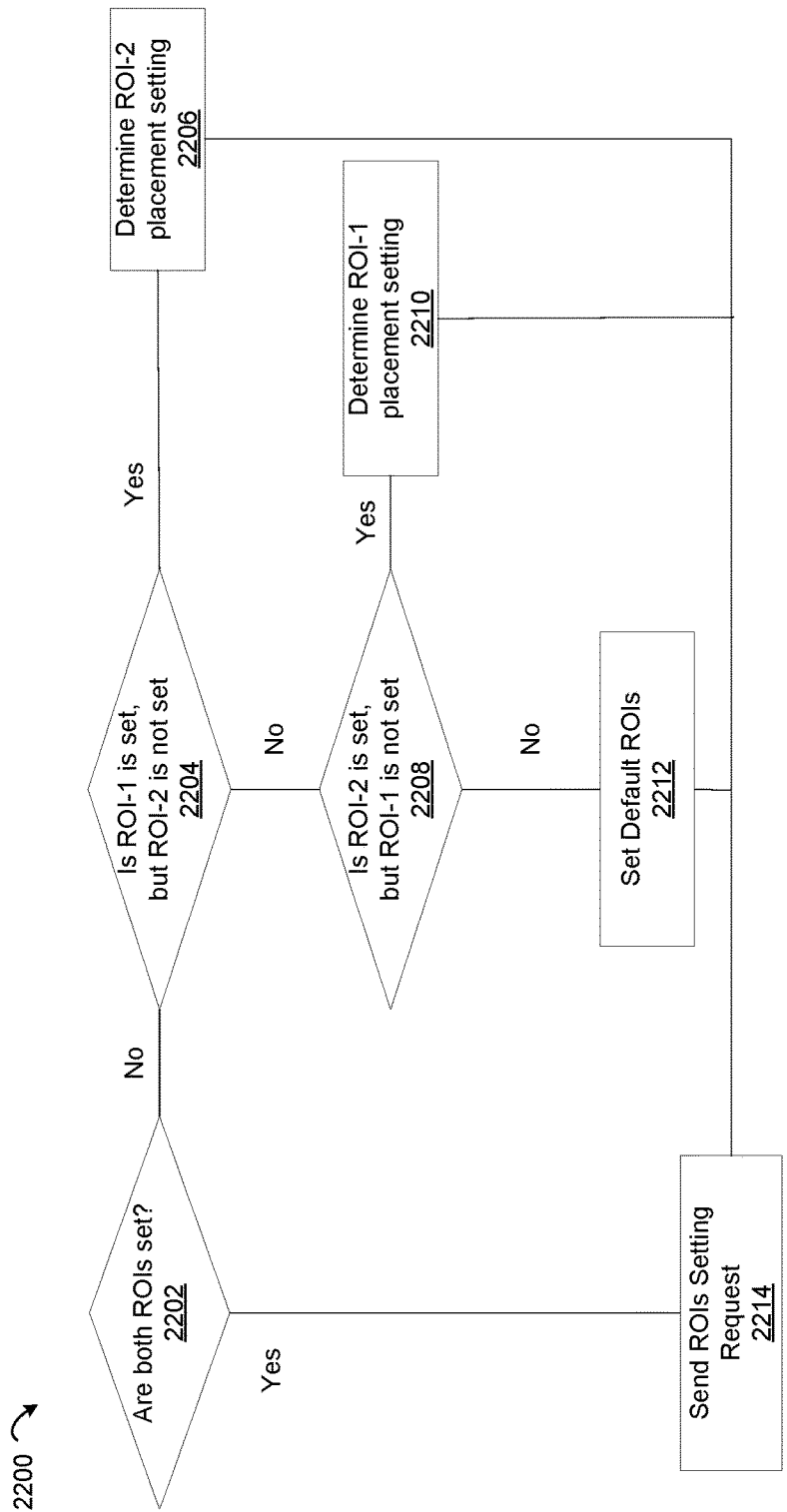
FIG. 22 is an example of a process for determining the sending of an ROI setting request, according to the present disclosure.

FIG. 22 is an example of a process 2200 for determining the sending of an ROI setting request, according to the present disclosure. These ROIs are referred to herein as ROI-1 and ROI-2. At block 2202, the process 2200 involves determining if both ROIs are set, one ROI per eye. In some embodiments, an ROI may be set around an eye or the pupil of the user.

At block 2204, the process 2200 involves determining if ROI-1 is set, but ROI-2 is not set. If so, the process 2200 would move to block 2206. Otherwise, the process would move to block 2208.

At block 2206, the process 2200 involves determining an appropriate ROI-2 placement setting. Different techniques are available to detect the shape, dimension, and/or position of ROI-2. For example, if the ROI-2 is to be centered around a pupil, the ROI-2 is positioned based on the detected pupil's position from the current image burst, on the interocular distance and the detected other pupil for which ROI-1 is set, or history of movement of the pupil. A similar approach could be used for centering the ROI-2 around the eye.

At block 2208, the process 2200 involves determining if ROI-2 is set, but ROI-1 is not set. If so, the process 2200 would move to block 2210. Otherwise, the process would move to block 2212.

At block 2210, the process 2200 involves determining an appropriate ROI-1 placement setting. This block is similar to block 2206, but performed for ROI-1 and the other pupil instead.

At block 2212, the process 2200 involves setting default ROIs. The default could be the last known positions of the pupil or eyes, or some default offsets from the center of the active area of the image sensor.

At block 2214, the process 2200 involves sending the ROIs setting request. In some embodiments, the image sensor reads out values corresponding to pixels that belong to the ROI, thereby generating the relevant ROI images.

The disclosure has now been described in detail for the purposes of clarity and understanding. However, it will be appreciated that certain changes and modifications may be practiced within the scope of the appended claims.

The above description provides exemplary embodiments only, and is not intended to limit the scope, applicability or configuration of the disclosure. Rather, the above description of the exemplary embodiments will provide those skilled in the art with an enabling description for implementing one or more exemplary embodiments. It being understood that various changes may be made in the function and arrangement of elements without departing from the spirit and scope of the disclosure as set forth herein.

For example, any detail discussed with regard to one embodiment may or may not be present in all contemplated versions of that embodiment. Likewise, any detail discussed with regard to one embodiment may or may not be present in all contemplated versions of other embodiments discussed herein. Finally, the absence of discussion of any detail with regard to embodiment herein shall be an implicit recognition that such detail may or may not be present in any version of any embodiment discussed herein.

Specific details are given in the following description to provide a thorough understanding of the embodiments. However, it will be understood by one of ordinary skill in the art that the embodiments may be practiced without these specific details. For example, circuits, systems, networks, processes, and other elements in the disclosure may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

The term "machine-readable medium" includes, but is not limited to, transitory and non-transitory, portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments of the disclosure may be implemented, at least in part, either manually or automatically. Manual or automatic implementations may be executed, or at least assisted, using machines, hardware, software, firmware, middleware, microcode, hardware description languages, or any combination thereof. When implemented in software, firmware, middleware or microcode, the program code or code segments to perform the necessary tasks may be stored in a machine-readable medium. A processor or processors may perform the necessary tasks.

As used herein, the phrase "a first thing based on a second thing," and the like, may mean that the first thing is based solely on the second thing, or that the first thing is based on the second thing as well as one or more additional things.

What is claimed is:

1. A method for reducing image sensor readout time and power consumption, the method comprising:
    detecting, from an image generated based on an image sensor, an eye element that comprises at least one of: an eye, a pupil of the eye, an iris of the eye, or a glint at the eye;
    determining a position corresponding to the eye element in an active area of the image sensor, wherein the active area corresponds to pixels of the image sensor;
    positioning a region of interest (ROI) within the active area, wherein the ROI is positioned based on the position corresponding to the eye element and is smaller than the active area; and
    reading out only a subset of the pixels of the image sensor, wherein the subset corresponds to the ROI;
    wherein the image is a DFS image that shows the eye and that is generated in a first image frame, wherein the ROI is positioned around the position corresponding to the eye, and further comprising:
    generating an ROI image based on pixel values of the subset in a second image frame, the ROI image showing the eye;
    detecting, from the ROI image, another position corresponding to the pupil;
    repositioning the ROI around the other position corresponding to the pupil;
    reading out only an updated subset of the pixels of the image sensor, wherein the updated subset corresponds to the repositioned ROI; and
    generating another ROI image based on updated pixel values of the updated subset in a third image frame, the other ROI image showing the pupil.

2. The method of claim 1, wherein the ROI image is at least one of a BP ROI image or a DP ROI image that shows the eye, and wherein the other ROI image is either another BP ROI image or another DP ROI image that shows the pupil.

3. The method of claim 2, wherein repositioning the ROI comprises reducing a size of the ROI such that the other ROI image shows the pupil and only a portion of the eye.

4. An eye tracking system, comprising:
an image sensor;
a processor; and
a memory storing computer-readable instructions that, upon execution by the processor, configure the eye tracking system to:
detect, from an image generated based on the image sensor, an eye element that comprises at least one of: an eye, a pupil of the eye, an iris of the eye, or a glint at the eye;
determine a position corresponding to the eye element in an active area of the image sensor, wherein the active area corresponds to pixels of the image sensor;
position a region of interest (ROI) within the active area, wherein the ROI is positioned based on the position corresponding to the eye element and is smaller than the active area; and
read out only a subset of the pixels of the image sensor, wherein the subset corresponds to the ROI;
wherein the image is a DFS image that shows the eye and that is generated in a first image frame, wherein the ROI is positioned around the position corresponding to the eye, and further configured to:
generate an ROI image based on pixel values of the subset in a second image frame, the ROI image showing the eye;
detect, from the ROI image, another position corresponding to the pupil;
reposition the ROI around the other position corresponding to the pupil;
read out only an updated subset of the pixels of the image sensor, wherein the updated subset corresponds to the repositioned ROI; and
generate another ROI image based on updated pixel values of the updated subset in a third image frame, the other ROI image showing the pupil.

5. The eye tracking system of claim 4, wherein the ROI image is at least one of a BP ROI image or a DP ROI image that shows the eye, and wherein the other ROI image is either another BP ROI image or another DP ROI image that shows the pupil.

6. The eye tracking system of claim 4, wherein repositioning the ROI comprises reducing a size of the ROI such that the other ROI image shows the pupil and only a portion of the eye.

7. A non-transitory computer readable medium storing instructions that, upon execution on an eye tracking system, configure the eye tracking system to perform operations comprising:
detecting, from an image generated based on an image sensor, an eye element that comprises at least one of: an eye, a pupil of the eye, an iris of the eye, or a glint at the eye;
determining a position corresponding to the eye element in an active area of the image sensor, wherein the active area corresponds to pixels of the image sensor;
positioning a region of interest (ROI) within the active area, wherein the ROI is positioned based on the position corresponding to the eye element and is smaller than the active area; and
reading out only a subset of the pixels of the image sensor, wherein the subset corresponds to the ROI;
wherein the image is a DFS image that shows the eye and that is generated in a first image frame, wherein the ROI is positioned around the position corresponding to the eye, and further comprising:
generating an ROI image based on pixel values of the subset in a second image frame, the ROI image showing the eye;
detecting, from the ROI image, another position corresponding to the pupil;
repositioning the ROI around the other position corresponding to the pupil;
reading out only an updated subset of the pixels of the image sensor, wherein the updated subset corresponds to the repositioned ROI; and
generating another ROI image based on updated pixel values of the updated subset in a third image frame, the other ROI image showing the pupil.

* * * * *